(12) United States Patent
Albero et al.

(10) Patent No.: US 11,568,614 B1
(45) Date of Patent: Jan. 31, 2023

(54) ADAPTIVE AUGMENTED REALITY SYSTEM FOR DYNAMIC PROCESSING OF SPATIAL COMPONENT PARAMETERS BASED ON DETECTING ACCOMMODATION FACTORS IN REAL TIME

(71) Applicant: BANK OF AMERICA CORPORATION, Charlotte, NC (US)

(72) Inventors: George Anthony Albero, Charlotte, NC (US); Olga Caroline Kocharyan, Matthews, NC (US); Deborah Lynn Mayers, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 29 days.

(21) Appl. No.: 17/392,188

(22) Filed: Aug. 2, 2021

(51) Int. Cl.
*G06T 19/00* (2011.01)
*G06F 30/13* (2020.01)

(52) U.S. Cl.
CPC ............ *G06T 19/006* (2013.01); *G06F 30/13* (2020.01); *G06T 19/003* (2013.01)

(58) Field of Classification Search
None
See application file for complete search history.

(56) References Cited

U.S. PATENT DOCUMENTS

| | | |
|---|---|---|
| 4,801,207 A | 1/1989 | Williams |
| 5,481,622 A | 1/1996 | Gerhardt et al. |
| 5,699,444 A | 12/1997 | Palm |
| 6,415,051 B1 | 7/2002 | Callari et al. |
| 7,256,899 B1 | 8/2007 | Faul et al. |
| 8,031,909 B2 | 10/2011 | Se et al. |
| 8,885,916 B1 | 11/2014 | Maurer et al. |
| 9,131,223 B1 | 9/2015 | Rangarajan et al. |
| 9,761,015 B2 | 9/2017 | Xiao et al. |

(Continued)

OTHER PUBLICATIONS

Seaborn, Katie, et al. "Accessible play in everyday spaces: mixed reality gaming for adult powered chair users." ACM Transactions on Computer-Human Interaction (TOCHI) 23.2 (2016): 1-28.*

(Continued)

*Primary Examiner* — Ryan M Gray
(74) *Attorney, Agent, or Firm* — Moore & Van Allen PLLC; Vaidehi Bachoti

(57) ABSTRACT

Embodiments of the invention are directed to systems, methods, and computer program products for adaptive augmented reality for dynamic processing of spatial component parameters based on detecting accommodation factors in real time. The system is further configured for dynamic capture, analysis and modification of spatial component parameters in a virtual reality (VR) space and real-time transformation to composite plan files. Moreover, the system comprises one or more composite credential sensor devices, comprising one or more VR spatial sensor devices configured for capture and imaging of VR spatial movement and position credentials. The system is also configured to dynamically transform and adapt a first immersive virtual simulation structure associated with the first physical location sector, in real-time, based on detecting and analyzing mobility assist devices associated with users.

20 Claims, 9 Drawing Sheets

(56) References Cited

U.S. PATENT DOCUMENTS

| | | | |
|---|---|---|---|
| 10,304,254 B2 | 5/2019 | Jovanovic et al. | |
| 10,375,306 B2 | 8/2019 | Shan et al. | |
| 10,515,486 B1 | 12/2019 | Chavez et al. | |
| 10,643,386 B2 | 5/2020 | Li et al. | |
| 11,164,382 B2* | 11/2021 | Hewitt | A63F 13/67 |
| 11,468,650 B2* | 10/2022 | Ramani | G06F 3/04815 |
| 11,475,650 B2* | 10/2022 | Berliner | G06F 3/165 |
| 2003/0012410 A1 | 1/2003 | Navab et al. | |
| 2003/0068098 A1 | 4/2003 | Rondinelli et al. | |
| 2004/0095385 A1 | 5/2004 | Koo et al. | |
| 2004/0239688 A1 | 12/2004 | Krajec | |
| 2005/0031167 A1 | 2/2005 | Hu et al. | |
| 2005/0261849 A1 | 11/2005 | Kochi et al. | |
| 2007/0065004 A1 | 3/2007 | Kochi et al. | |
| 2008/0075324 A1 | 3/2008 | Sato et al. | |
| 2008/0159595 A1 | 7/2008 | Park et al. | |
| 2008/0201101 A1 | 8/2008 | Hebert et al. | |
| 2012/0215500 A1 | 8/2012 | Ciuti et al. | |
| 2016/0371855 A1 | 12/2016 | Jovanovic et al. | |
| 2020/0137519 A1* | 4/2020 | Dolan | H04W 4/024 |
| 2022/0262784 A1* | 8/2022 | Hwang | H01L 25/167 |

OTHER PUBLICATIONS

Biswas, Pradipta, et al. "Adaptive accessible AR/VR systems." Extended Abstracts of the 2021 CHI Conference on Human Factors in Computing Systems. 2021.*

Maio, Rafael, et al. "Exploring an Augmented Reality Serious Game for Motorized Wheelchair Control." Proceedings of the 2022 International Conference on Advanced Visual Interfaces. 2022.*

Zolotas, Mark, Joshua Elsdon, and Yiannis Demiris. "Head-mounted augmented reality for explainable robotic wheelchair assistance." 2018 IEEE/RSJ International Conference on Intelligent Robots and Systems (IROS). IEEE, 2018.*

Zolotas, Mark, and Yiannis Demiris. "Towards explainable shared control using augmented reality." 2019 IEEE/RSJ International Conference on Intelligent Robots and Systems (IROS). IEEE, 2019.*

* cited by examiner

ADAPTIVE AUGMENTED REALITY SYSTEM FOR DYNAMIC PROCESSING OF SPATIAL COMPONENT PARAMETERS BASED ON DETECTING ACCOMMODATION FACTORS IN REAL TIME

FIELD OF THE INVENTION

The present invention is directed to, in general, facilitating adaptive augmented reality for dynamic processing of spatial component parameters based on detecting accommodation factors in real time. Furthermore, the present invention is configured for dynamic capture, analysis and modification of spatial component parameters in a virtual reality (VR) (e.g., including augmented reality (AR)) space and real-time transformation to composite plan files.

BACKGROUND

Conventional technology is directed to mere planar floor plans associated with building structures. However, conventional technology is not configured for dynamically detecting and processing the planar floor plans based on accommodation factors of users, much less transforming spatial component parameters thereof. Moreover, existing systems are not capable of harnessing other network devices associated with the individuals for facilitating detection and transformation of spatial component parameters. There is a need for a novel system structured for dynamic capture, analysis and modification of spatial component parameters based on accommodation factors of users. Furthermore, there is a need for a system that is structured for adaptive augmented reality for dynamic processing of spatial component parameters based on detecting accommodation factors in real time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, methods and computer program products for adaptive augmented reality for dynamic processing of spatial component parameters based on detecting accommodation factors in real time. Embodiments of the invention relate to systems, methods, and computer program products for dynamic capture, analysis and modification of spatial component parameters in a virtual reality (VR) space and real-time transformation to composite plan files. The invention comprises: at least one VR composite credential capture device associated with one or more composite credential sensor devices, comprising: one or more VR spatial sensor devices configured for capture and imaging of VR spatial movement and position credentials. The invention further comprises at least one memory device with computer-readable program code stored thereon; at least one communication device; at least one processing device operatively coupled to the at least one VR composite credential capture device, the at least one memory device and the at least one communication device. Typically, executing the computer-readable code is configured to cause the at least one processing device to: receive, via a user interface of a network device, a request for an accommodation mobility activity from a user, wherein the accommodation mobility activity is associated with a first physical location sector, wherein the physical location sector is associated with a plurality of physical spatial components; detect, via the at least one VR composite credential capture device, initiation of the accommodation mobility activity by a user; trigger, using the one or more composite credential sensor devices of the at least one VR composite credential capture device, capture of one or more VR composite credentials of the user at a first time; construct a first immersive virtual simulation structure associated with the first physical location sector, wherein constructing the first immersive virtual simulation structure further comprises constructing a plurality of simulated mobility impeding structures associated with the plurality of physical spatial components based on a layout of the first physical location sector; present, via a user display device, the first immersive virtual simulation structure to the user such that a first location associated with the user is within the first immersive virtual simulation structure associated with the first physical location sector; detect, via the one or more composite credential sensor devices, a first path portion of the user from the first location to a second location in the first immersive virtual simulation structure; determine a first mobility impeding structure of the plurality of simulated mobility impeding structures that is structured to impede the mobility of the user along the first path portion; perform a first modification, in real-time, of the first mobility impeding structure in the first immersive virtual simulation structure, wherein modifying comprises (i) spatially displacing the first mobility impeding structure, (ii) modifying one or more structural parameters of the first mobility impeding structure, and/or (iii) removing the first mobility impeding structure; and present, dynamically, the first modification of the first mobility impeding structure in the first immersive virtual simulation structure to the user.

In one embodiment, or in combination with the previous embodiment, the invention is further configured to: generate a first plan file associated with the first physical location sector, wherein the first plan file is associated with a planar projection of the layout associated with the first physical location sector.

In one embodiment, or in combination with the previous embodiment, the invention is further configured to: transform, in real time, the first modification of the first mobility impeding structure into a composite plan modification associated with a planar projection of the first mobility impeding structure; and transform the first plan file based on the composite plan modification, such that the transformed first plan file comprises the planar projection the first modification of the first mobility impeding structure.

In one embodiment, or in combination with the previous embodiment, the invention is further configured to: initiate a presentation of the transformed first plan file via the network device within the user interface and/or the user display device within the first immersive virtual simulation structure, within a predetermined time interval following the first modification of the first mobility impeding structure at the first immersive virtual simulation structure.

In one embodiment, or in combination with the previous embodiment, the invention is further configured to: construct a final plan file for the first physical location sector based on the transformed first plan file; and initiate, via the network device, presentation of the final plan file.

In one embodiment, or in combination with the previous embodiment, the at least one VR composite credential capture device comprises the user display device.

In one embodiment, or in combination with the previous embodiment, the invention is further configured to: analyze the captured one or more VR composite credentials of the user at the first time; determine a first accommodation factor associated with the user, wherein the first accommodation factor is associated with mobility of the user at the first physical location sector; and determine a first mobility assist device associated with the user, wherein the first mobility assist device is associated with facilitating mobility of the user at the first physical location sector; and wherein determining that the first mobility impeding structure of the plurality of simulated mobility impeding structures is structured to impede the mobility of the user along the first path portion comprises determining that (i) the first mobility impeding structure impedes the first accommodation factor associated with the user, and/or (ii) the first mobility impeding structure impedes the first mobility assist device associated with the user.

In one embodiment, or in combination with the previous embodiment, the invention is further configured to: detect a first user modification action performed by the user on the first mobility impeding structure within the first immersive virtual simulation structure, wherein the first modification of the first mobility impeding structure in the first immersive virtual simulation structure is based on the user modification action.

In one embodiment, or in combination with the previous embodiment, detecting the first user modification action performed by the user on the first mobility impeding structure further comprises: determining one or more spatial position-movement credentials associated with first user modification action; determining a first gesture associated with the one or more spatial position-movement credentials; and determining that (i) the first gesture and (ii) the one or more spatial position-movement credentials match a predetermined modification action and match the first mobility impeding structure.

In one embodiment, or in combination with the previous embodiment, the invention is further configured to: determine one or more structural parameters associated with the first mobility impeding structure; and present, via the user display device, the one or more structural parameters associated with the first mobility impeding structure to the user within the first immersive virtual simulation structure.

In one embodiment, or in combination with the previous embodiment, the invention is further configured to: detect a second user modification action performed by the user on a second mobility impeding structure of the plurality of simulated mobility impeding structures within the first immersive virtual simulation structure; determine a first change in one or more structural parameters associated with the second mobility impeding structure caused by the second user modification action; analyze the second user modification action and the first change in the one or more structural parameters associated with the second mobility impeding structure; in response to determining that (i) the second user modification action is not compatible with the second mobility impeding structure, and/or (ii) the second user modification action is not compatible with the first physical location sector, prevent the second user modification action by the user; and present a compatibility error associated with the second user modification action within the first immersive virtual simulation structure.

In one embodiment, or in combination with the previous embodiment, determining that the second user modification action is not compatible with the first physical location sector further comprises: determining that the first change in one or more structural parameters associated with the second mobility impeding structure associated with the second user modification action causes a cascading change in one or more structural parameters associated with one or more of the plurality of physical spatial components associated with first physical location sector; and determining that the cascading change in one or more structural parameters is outside of a predetermined threshold range.

In one embodiment, or in combination with the previous embodiment, the invention is further configured to: detect, using the one or more VR spatial sensor devices, one or more first mechanical degree of freedom coordinate parameters of the user in a predetermined capture region proximate the one or more VR spatial sensor devices; and determine one or more spatial position-movement credentials of the user based on the detected one or more first mechanical degree of freedom coordinate parameters, wherein the one or more VR composite credentials of the user comprise the one or more spatial position-movement credentials.

In one embodiment, or in combination with the previous embodiment, presenting, dynamically, the first modification of the first mobility impeding structure in the first immersive virtual simulation structure to the user, further comprises: transmitting a trigger communication to the user display device to cause the user display device to modify a visual representation of the first modification of the first mobility impeding structure, in response to determining that a display portion of a display area of the user display device overlaps a current user view zone, wherein the trigger communication is configured to cause the user display device to apply a predetermined Gaussian blur to the display area of the user display device that is not associated with the first modification.

In one embodiment, or in combination with the previous embodiment, the invention is further configured to: construct a first route associated with the first physical location sector for directing the user, wherein the first route comprises the first path portion; and present, dynamically, the first route in the first immersive virtual simulation structure to direct the user through the first immersive virtual simulation structure.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
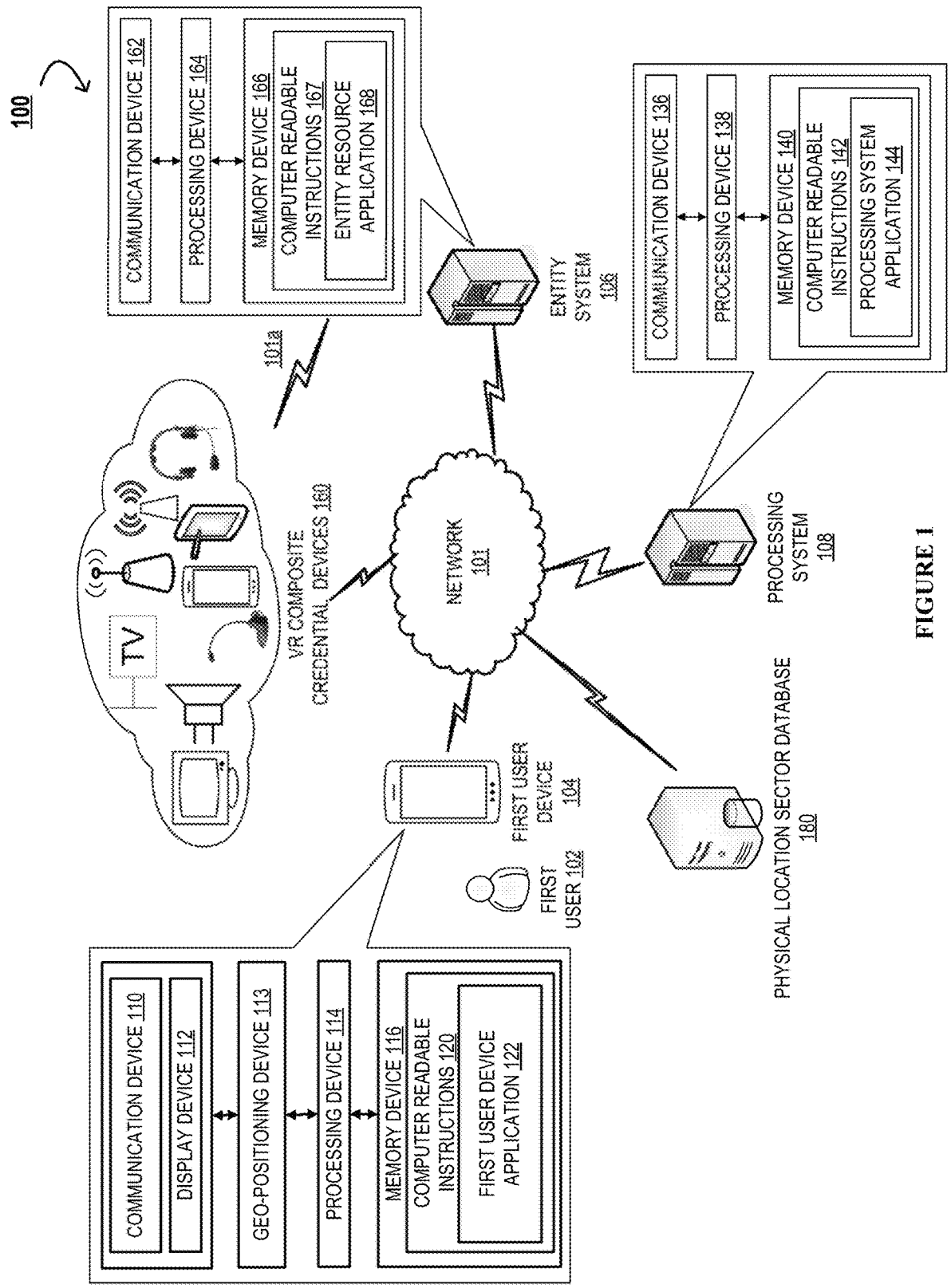
Figure 2:
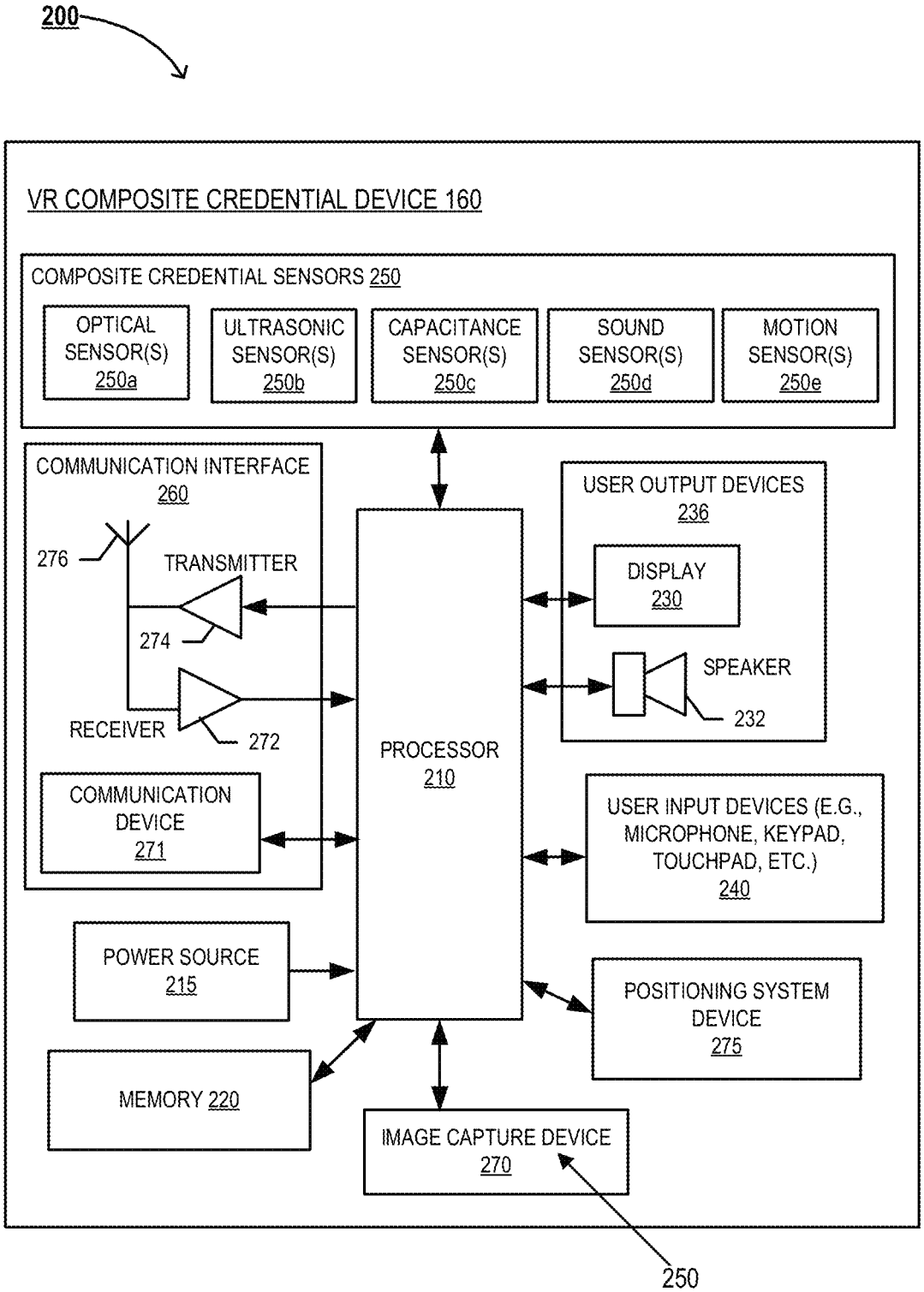
Figure 3A:
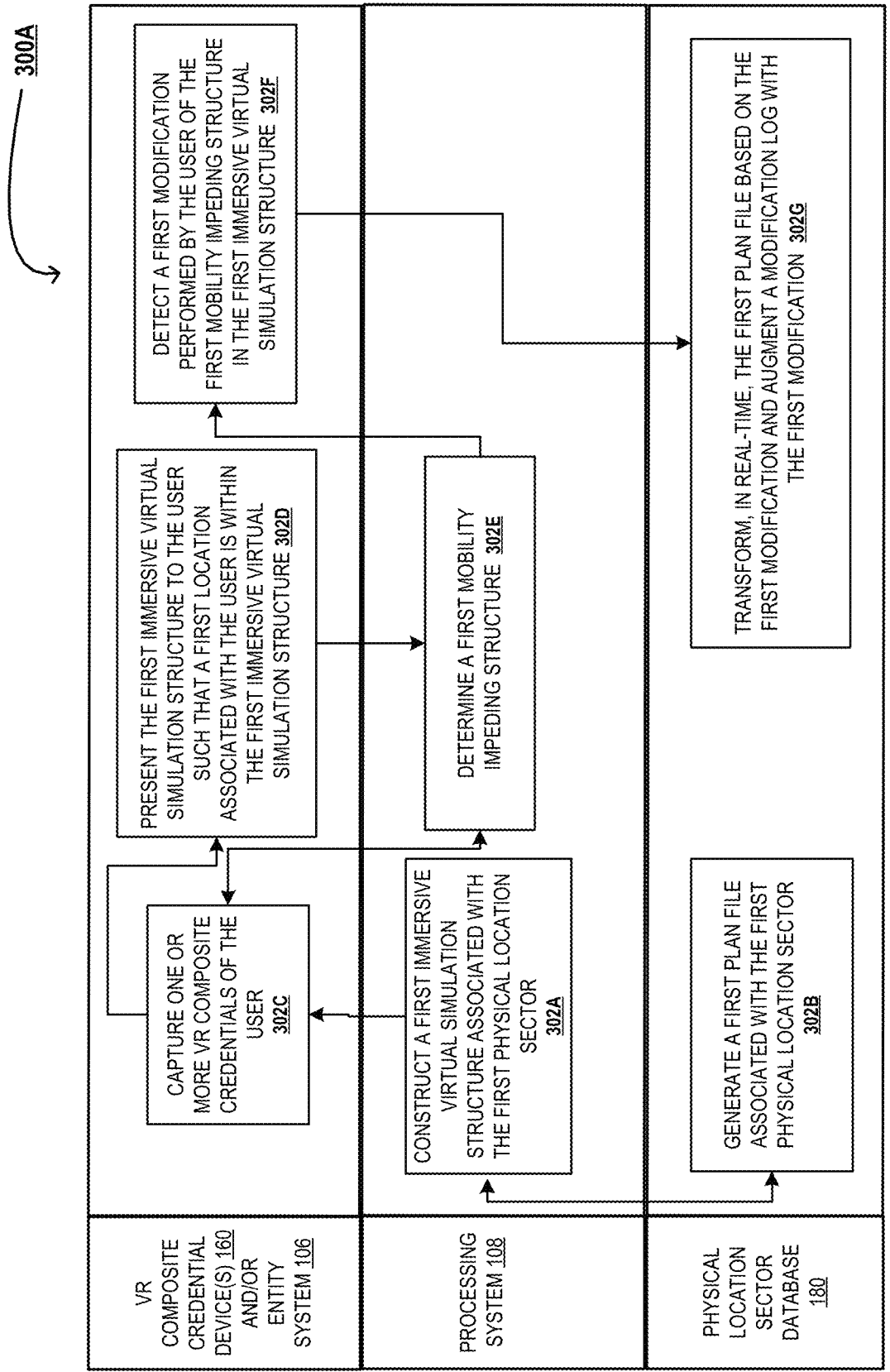
Figure 3B:
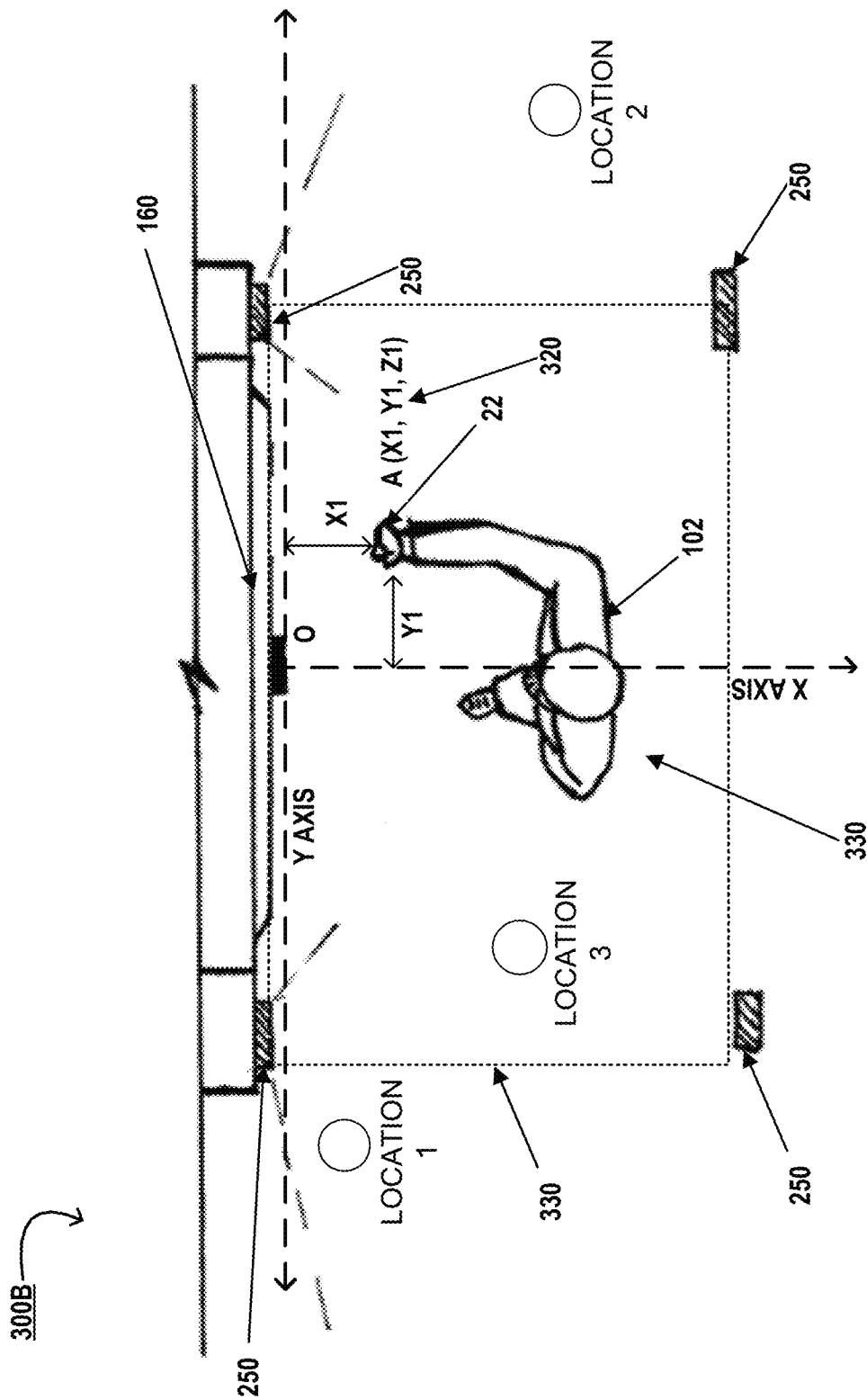
Figure 3C:
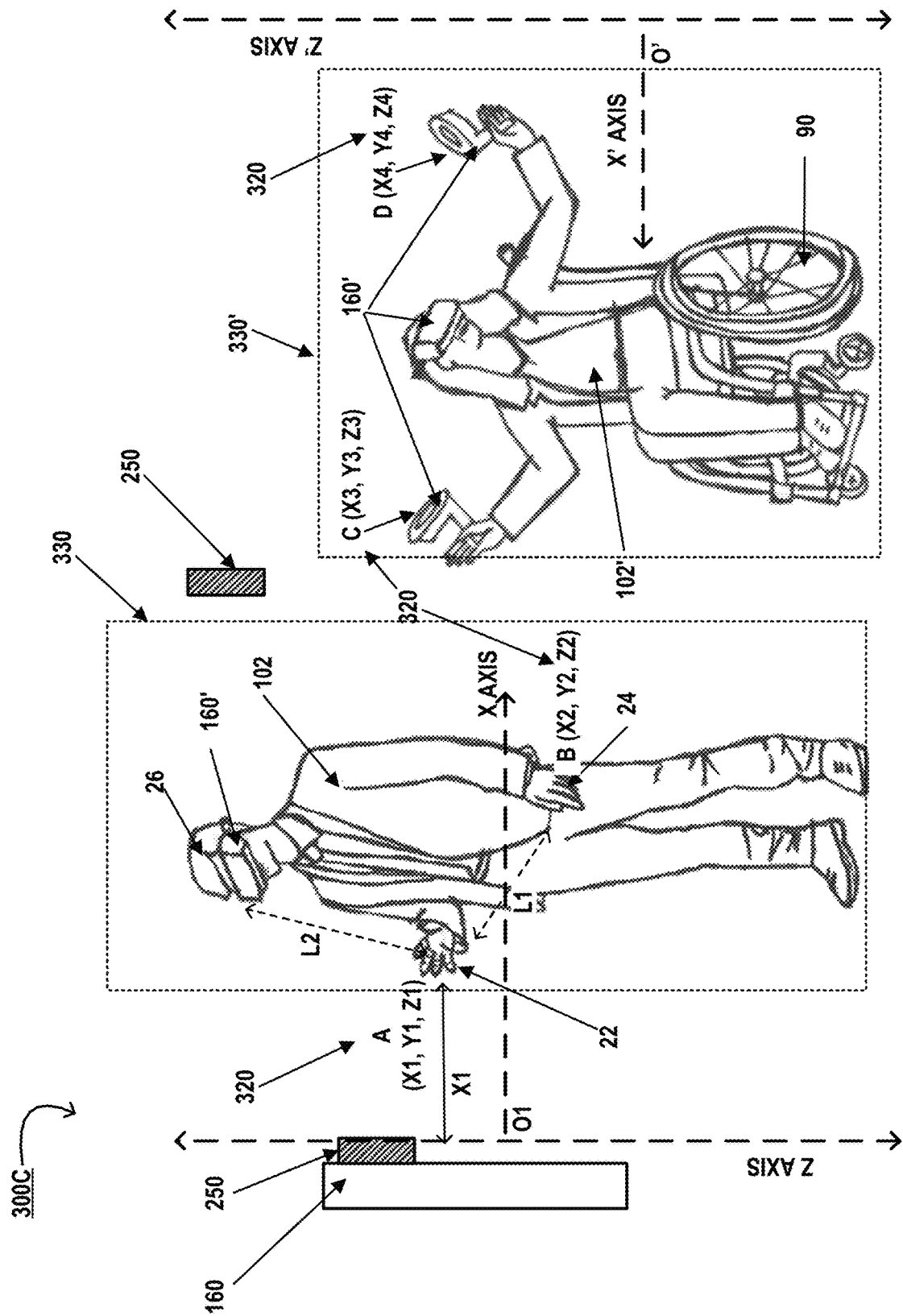
Figure 3D:
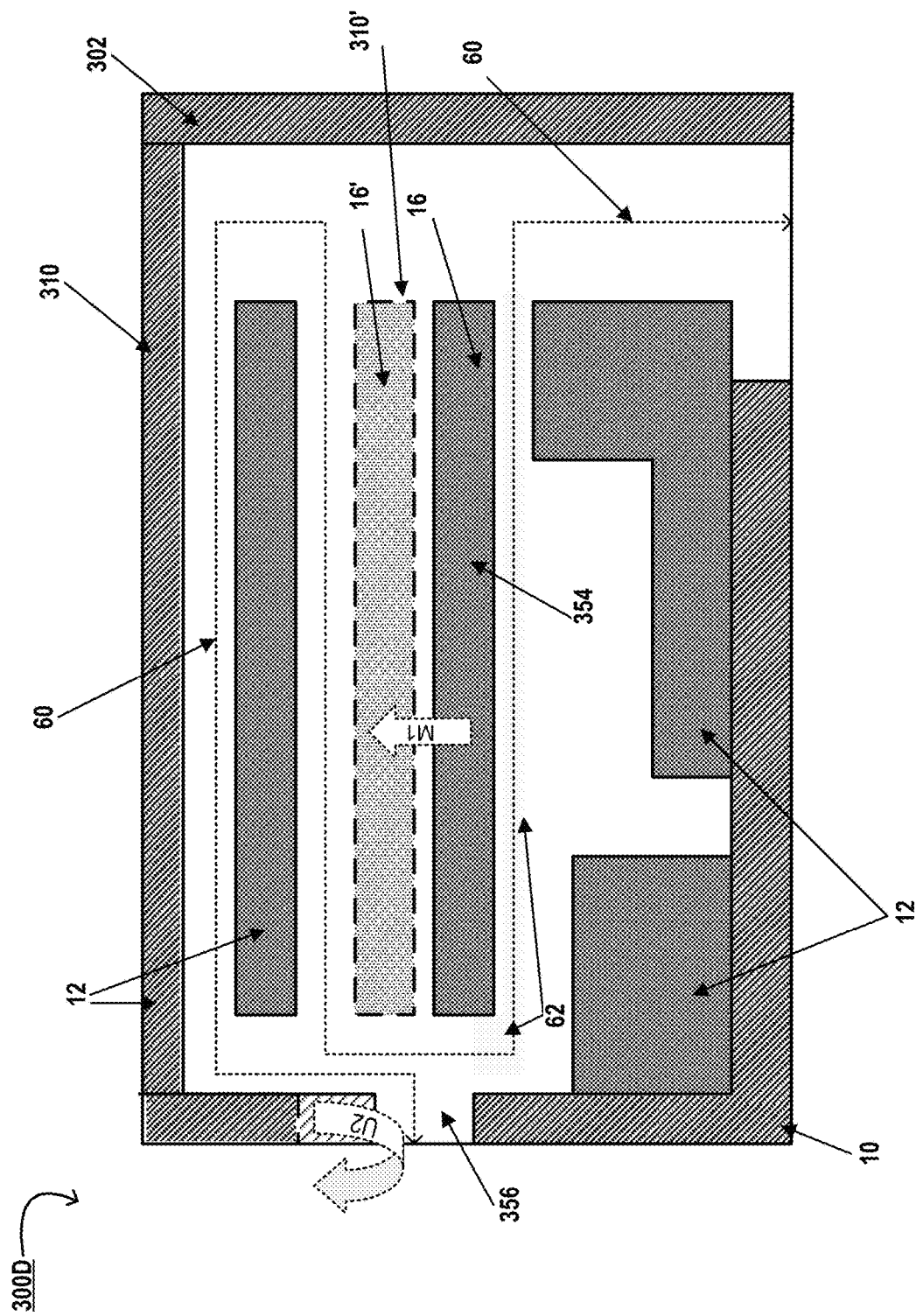
Figure 3E:
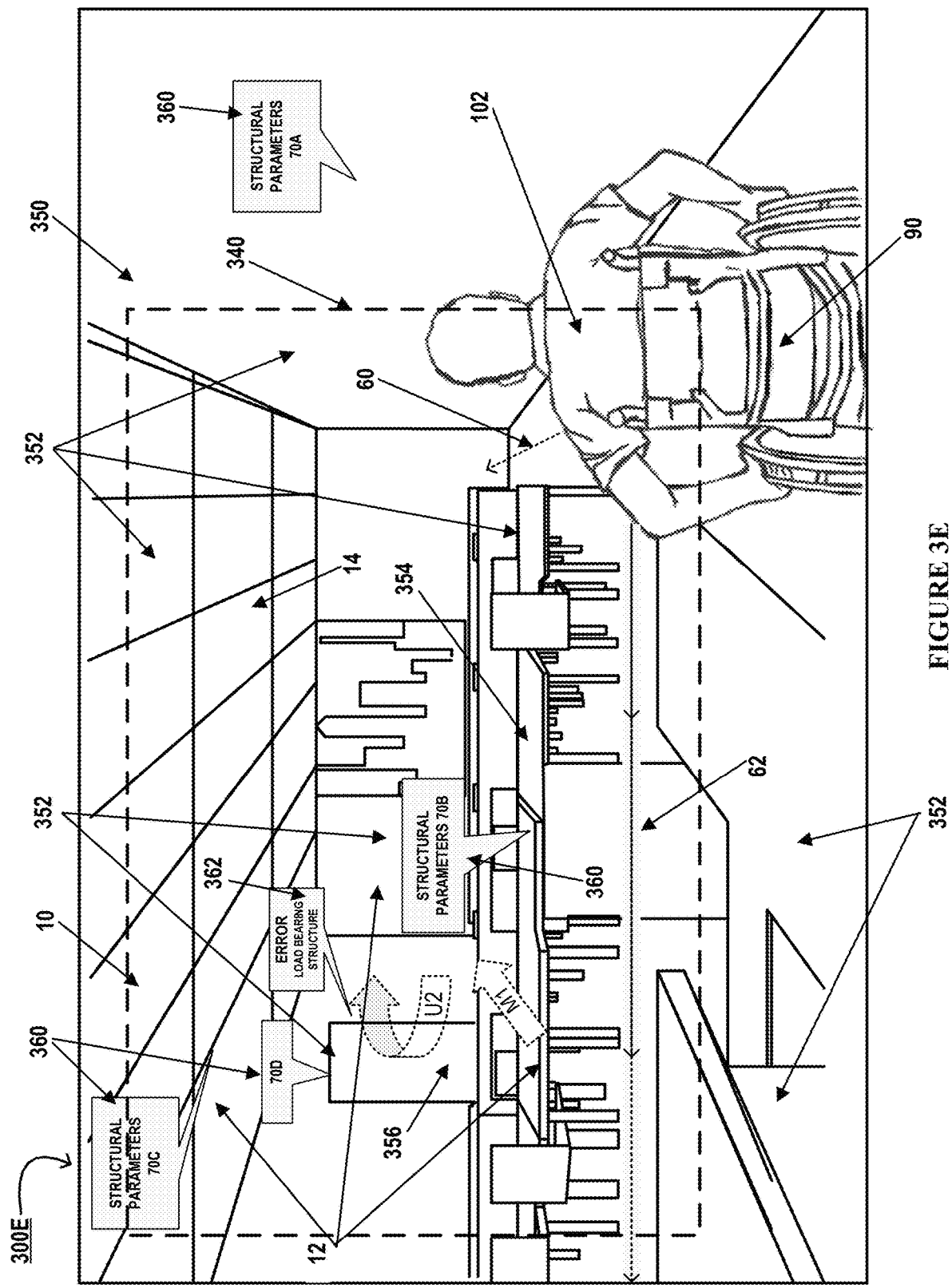
Figure 4A:
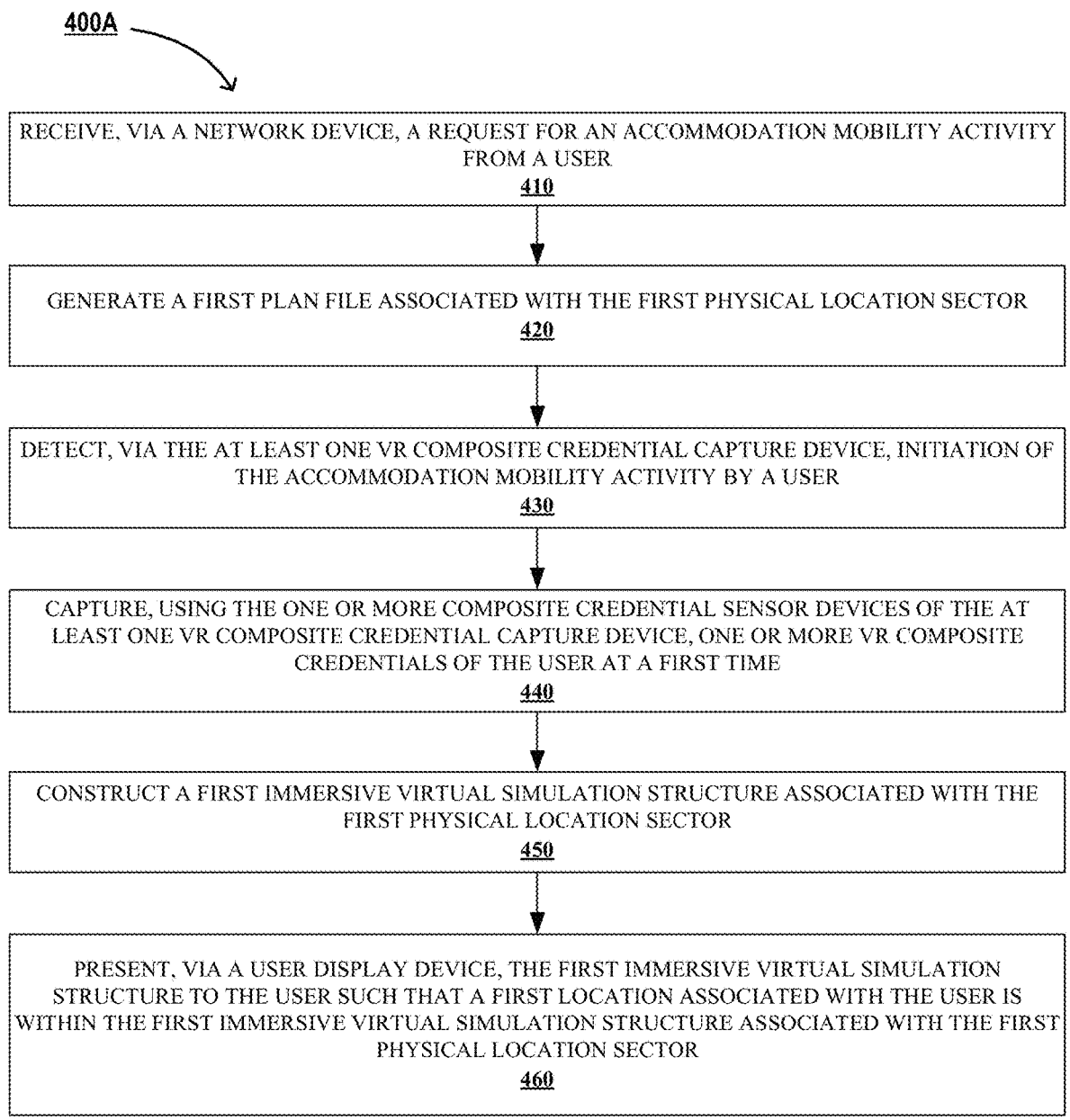
Figure 4B:
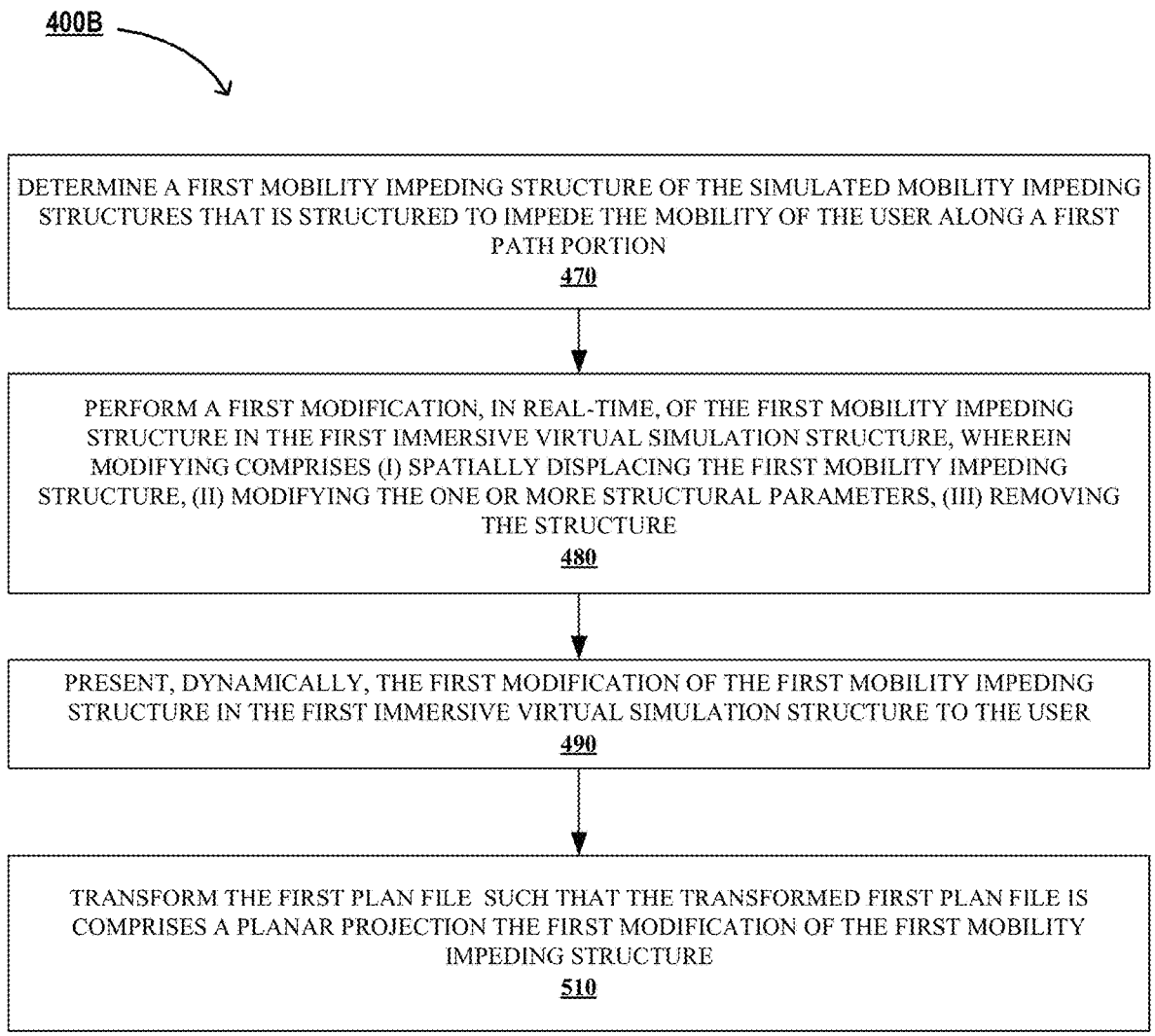

Having thus described embodiments of the invention in general terms, reference will now be made to the accompanying drawings, wherein:

FIG. 1 depicts an enhanced communication platform environment 100, in accordance with one embodiment of the present invention;

FIG. 2 illustrates a schematic block diagram representation 200 of a VR composite credential device 160, in accordance with an embodiment of the invention;

FIG. 3A illustrates a block diagram illustrating a high level process flow 300A for dynamic capture, analysis and modification of spatial component parameters in a virtual reality (VR) space and real-time transformation to composite plan files, in accordance with an embodiment of the invention;

FIG. 3B illustrates a top view schematic representation 300B of an immersive virtual simulation structure environment and VR composite credential capture associated with user(s), in accordance with an embodiment of the invention;

FIG. 3C illustrates a side view schematic representation 300C of the immersive virtual simulation structure environment and VR composite credential capture associated with user(s) of FIG. 3B, in accordance with an embodiment of the invention;

FIG. 3D illustrates a schematic representation 300D of a user interface 302 presenting a first plan file 310, in accordance with an embodiment of the invention;

FIG. 3E illustrates a schematic representation 300E of a presentation of first immersive virtual simulation structure, in accordance with an embodiment of the invention;

FIG. 4A illustrates a block diagram depicting a high level process flow 400A for adaptive augmented reality based dynamic processing of spatial component parameters based on detecting accommodation factors in real time, in accordance with an embodiment of the invention; and FIG. 4B illustrates a block diagram depicting a high level process flow 400B for adaptive augmented reality based dynamic processing of spatial component parameters based on detecting accommodation factors in real time in conjunction with FIG. 4A, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with some embodiments of the invention, the term "VR composite credentials" may refer to spatial movement and position credentials of VR composite credential capture devices (specifically VR composite credential capture devices of a tactile type) associated with the user with respect to an immersive virtual simulation structure environment. In accordance with some embodiments of the invention, the term "VR composite credentials" may refer to spatial movement and position credentials of the user's body that may be used to identify users, and/or detect gestures and actions performed by the user with respect to an immersive virtual simulation structure environment. In some embodiments, the spatial movement and position credentials may refer to the position, location, movement, gestures and/or the like of the user (user's phalanges, i.e., the user's hand(s) and/or finger(s)) and/or of the VR composite credential capture devices (specifically VR composite credential capture devices of the tactile type) associated with the user with respect to an immersive virtual simulation structure environment. In some embodiments, the VR composite credentials may refer to a combination of spatial movement and position credentials of the user and of the VR composite credential capture devices associated with the user with respect to an immersive virtual simulation structure environment. In some embodiments, the VR composite credentials are non-tactile, i.e., not based on touch or contact between the user and components/devices for capturing the credentials. In some embodiments, the VR composite credentials, e.g., the non-tactile type VR composite credentials may comprise optical (e.g., light-based), audio (e.g., sound based, sonar based, etc.), sensitivity to sensory signals, and/or the like.

In accordance with embodiments of the invention, the term "user" may refer to a an individual or the like, who utilizes a user device or a network device for utilizing adaptive augmented reality based dynamic processing of spatial component parameters based on detecting accommodation factors in real time. In some embodiments, the user may be associated with one or more accommodation factors. As used herein, an accommodation factor may relate to an aspect of a user (i.e., an individual) that may differently affect the user's mobility. As non-limiting examples, the accommodation factor(s) may comprise movement, vision, depth perception, sound perception, and/or the like. In some embodiments, the user may be associated with one or more mobility assist devices utilized by the user for mobility purposes. In this regard, the one or more mobility assist devices may comprise a wheelchair, crutches, a cane, sonar navigation device, seeing-eye dog, and/or the like.

In accordance with embodiments of the invention, the term "entity" may refer to a customer, seller, merchant, or the like. In some embodiments, the term "entity" may refer to a financial institution or a financial entity. The term "resource processing device" or "transaction terminal" as used herein may refer to one or more electronic devices that facilitate user transactions or activities. As such, the terms "electronic activity", "user transaction" or "user activity" may refer to financial or non-financial transactions or activities. In some embodiments a resource processing device refers to one or more devices that facilitate execution of financial transactions. In this regard the resource processing devices can comprise Automated Teller Machines (ATMs), resource terminals or Point of sale devices (POS), vending machines, checkout registers, ticket vending machines, automated retail transaction devices, banking terminals in a financial institution and other transaction terminals that involve financial transactions in one form or another. In some embodiments the resource processing device refers to devices that facilitate execution of non-financial transactions or activities, for example, check-in terminals for various industries, for example: hospitality, travel, and the like, information kiosks and other transaction terminals that do not involve a user performing a financial transaction via the transaction terminal. In some embodiments the resource processing devices facilitate execution of both financial and non-financial transactions/activities. In some embodiments, resource processing devices may refer to user devices that facilitate financial and/or non-financial transactions, such as laptop computers, tablet computers, smartphones, wearable devices, personal digital assistants (PDAs), and other portable or stationary computing devices. In some embodiments, the resource processing devices may be owned, operated and/or otherwise associated entities and are installed at suitable locations, such that the user can travel to the location of the resource processing device to execute transactions. In some embodiments, the resource processing devices may be owned, operated and/or otherwise associated with an entity, such as a financial institution. In some embodiments, the resource processing devices may be owned, operated and/or otherwise associated with the user. The embodiments described herein may refer to the initiation and completion of an electronic activity, a user activity or a transaction. In some embodiments, the present invention is structured for detecting accommodation factors associated with resource processing devices or transaction terminals, e.g., detecting whether a physical structure of an ATM or POS device allows for accommodation of a mobility assist device (e.g. a wheelchair) associated with a user, and/or functionality with respect to an accommodation factor (e.g., sound, vision, and movement factors) associated with the user.

In some embodiments, an "entity" or "enterprise" as used herein may be any institution or establishment, associated with a network connected resource transfer platform, resource sharing systems and the like. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity and/or a financial institution. In some embodiments, a "user" or "entity" may be an employee (e.g., an associate, a project manager, a specialist, a manager, an administrator, an internal operations analyst, or the like) of the entity or enterprises affiliated with the entity, capable of operating the systems described herein. In some embodiments, a "user" or "first user" may be any individual, entity or system who has a relationship with the entity, such as a customer or a prospective customer. In other embodiments, a user may be a system performing one or more tasks described herein.

In some embodiments, "resources" or "resource" or "at least one resource" as used herein may refer to products, services, financial accounts, possessions, merchandise, properties, goods and the like associated with an individual or user. A "credential instrument," "technology resource" or "account" may be the relationship that the first user has with the entity (e.g., a financial institution). Examples of credential instruments include a deposit account, such as a transactional account (e.g. a banking account), a savings account, an investment account, a money market account, a time deposit, a demand deposit, a pre-paid account, a credit account, a non-monetary user information associated with the user, or the like. The credential instrument or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more credential instruments or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface. Typically, a graphical user interface (GUI) is a type of interface that allows users to interact with graphical elements such as graphical icons and visual indicators such as secondary notation (e.g., via a screen, via pointer devices, via gestures, via spatial sensing, etc.), as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. The graphical user interface may also be configured to be presented on one or more display devices associated with user devices that are configured for providing real or virtual interactive projections of the interface.

Typically, a myriad of physical location sectors is prevalent. The physical location sectors may comprise, a building/dwelling (e.g., a building structure), a portion of the building/dwelling, a floor associated with a building/dwelling, a portion of a floor associated with a building/dwelling, a combination of a plurality of rooms of the building/dwelling, a room of the building/dwelling and/or the like. Here, a building/dwelling may be associated with an office space, a business space, a home, a stadium, a venue, a commercial space, a residential space, a financial institution, and/or the like. Typically, each physical location sector comprises one or more physical spatial components such as one or more floors, roofs, walls, load bearing structures (e.g., beams, pillars, joists, etc.), entrances and exits (e.g., doorways, doors, etc.), windows, fixtures, furniture, walkways, corridors, stairs, elevators, variations in a contour of the floor (e.g., slope, a protrusion in the floor, a depression in the floor, and/or the like), and/or other physical structures and items. Here, the one or more physical spatial components may be associated with one or more structural parameters comprising fixed parameters of the physical spatial components such as coordinates (e.g., cartesian coordinated with respect to a predetermined origin), height parameters, depth parameters, width parameters, angle of slope, associated/structurally connected physical spatial components (e.g., a beam supporting a wall), supported load value, supported moments and forces, elevation, and/or the like. The one or more physical spatial components may be associated with one or more structural parameters comprising observer-based variable parameters of the physical spatial components which are relative to an observer (e.g., relative to the user's location in the immersive virtual simulation structure)

such as distance from observer, difference between a height of the observer and a height of the physical spatial component, and/or the like. The observer-based variable type structural parameters may be continuously and dynamically determined in-situ, in real-time, while the user is within or is navigating the immersive virtual simulation structure. Moreover, the three-dimensional arrangement of the one or more physical spatial components within the physical location sector may be referred to as a layout of the physical location sector. In some embodiments, the one or more physical spatial components, their three-dimensional layout, and/or the associated structural parameters, either singularly or in combination, may be referred to as spatial component parameters.

Conventional technology is directed to mere two dimensional planar floor plans associated with physical location sectors. These planar floor plans are not capable of including portions of the physical spatial components that are not present within the particular plane of the floor plan. This paucity of physical spatial components in the conventional floor plans render impossible the complete analysis and determination of associated mobility implications (e.g., for users with movement based accommodation factors, for users with mobility assist devices, etc.). Moreover, conventional technology is not configured for dynamically detecting and processing the planar floor plans based on accommodation factors of users, much less transforming spatial component parameters thereof. Moreover, existing systems are not capable of harnessing other network devices associated with the individuals for facilitating detection and transformation of spatial component parameters. There is a need for a novel system structured for dynamic capture, analysis and modification of spatial component parameters based on accommodation factors of users. Furthermore, there is a need for a system that is structured for adaptive augmented reality for dynamic processing of spatial component parameters based on detecting accommodation factors in real time.

The present invention provides solutions to the aforementioned problems in existing technology, and also provides additional features and advantages. First, the present invention is structured for dynamic analysis and detection of mobility impeding structures that may affect a user's mobility within a physical location sector. Second, moreover, the present invention is structured to tailor this dynamic analysis, detection and processing of spatial component parameters of mobility impeding structures to particular accommodation factors and/or associated mobility assist devices associated with a user. Third, the present invention is structured to construct an immersive virtual simulation structure, in a manner that emulates the observer point of view of the user associated with the accommodation factors and/or associated mobility assist devices. In this manner, due to the adaptive immersive, augmented reality-nature of the immersive virtual simulation structure, the present invention makes possible the dynamic analysis, detection and processing of spatial component parameters of mobility impeding structures to particular accommodation factors.

Fourth, the immersive virtual simulation structure is constructed to offer an immersive experience to the participating user, with the immersive virtual simulation structure being presented in a 360° view around a physical location of the user. Here, the immersive virtual simulation structure may be constructed to present a 1:1 simulation of the physical location sector to the participating user. The user can navigate thru the simulation of the physical location sector in a physical mobility assist device to determine accessibility, heights, flooring, and/or the like, in a safe and secure manner. Alternatively, the invention may construct a simulated mobility assist device to determine accessibility, heights, flooring, etc. Users may then navigate through paths in the simulation of the physical location sector to ensure it is accessible, usable, and that it incorporates best practices (e.g., ensuring that a user with a mobility assist device can access an ATM fully without hitting a wall). As a non-limiting example, the present invention may allow for analysis of a physical location sector for a user with visual accommodation factors, e.g., checking for Braille, or a new type of QR code, (e.g., associated with a navigation guidance system), and to ensure they are able to navigate independently without any impediments. As another non-limiting example, the present invention may allow for analysis of a physical location sector for a user with auditory accommodation factors, e.g., to ensure users are notified of all alarms, communications, messages, and/or the like. In this regard, the present invention is structured to operatively control and combine functionality of a plurality of VR composite credential capture devices, sensor devices, display devices, VR input/output devices, and/or other networked devices.

Fifth, the present invention is structured to dynamically modify or allow the user to reconfigure, i.e., dynamically modify the spatial component parameters associated with physical location sector from within the immersive virtual simulation structure, in real-time. In this regard, in some embodiments, the system may determine potential reconfigurations of the physical location sector that would address the accommodation factors of the user and enhance mobility and preset these reconfigurations to the user. In some embodiments, these reconfigurations may be based on prior layouts for similar physical location sectors (e.g., with similarly determined based on square footage, accommodation, and geolocation variables, and/or the like). Sixth, the present invention is further structured to dynamically transform the modifications in the immersive virtual simulation structure into composite plan files, in real-time.

FIG. 1 illustrates enhanced communication management platform environment 100 for adaptive augmented reality based dynamic processing of spatial component parameters based on detecting accommodation factors in real time, in accordance with one embodiment of the present invention. The enhanced communication management platform is structured for dynamic capture, analysis and modification of spatial component parameters in a virtual reality (VR) space and real-time transformation to composite plan files. As illustrated in FIG. 1, a processing system 108, configured for providing an intelligent, proactive and responsive control, communication, data retrieval, and data processing at VR composite credential devices 160 of an entity system 106 and/or user device 104, is structured for establishing intelligent and responsive communication with the network 101 and devices thereof.

The processing system 108 (referred to as "the system" or "the system 108") is operatively coupled, via a network 101 to an entity system 106, to VR composite credential devices 160 of the entity system 106, to one or more user devices 104, to other external systems such as a physical location sector database 180 (e.g., structured for storing composite plan files, structural parameters and spatial component data associated with physical location sectors, storing modifications of spatial component parameters in a virtual reality (VR) space and reasons thereof, and/or the like), and other external systems/third-party servers not illustrated herein. In this way, the processing system 108 can send information to and receive information from an entity system 106, VR composite credential devices 160 of the entity system 106, one or more user devices 104, the physical location sector database 180 and/or a plurality of distributed systems (not illustrated), to provide adaptive augmented reality based dynamic processing of spatial component parameters based on detecting accommodation factors in real time, particularly for an user 102 of the entity system 106. As referred to herein, user device 104 or first user device 104 may refer to a device employed by a first user 102 (e.g., a customer of an entity) to conduct a immersive virtual simulation session for dynamic processing of spatial component parameters based on detecting accommodation factors in real time.

At least a portion of the platform for dynamic processing of spatial component parameters based on detecting accommodation factors in real time, is typically configured to reside on the processing system 108 (for example, at the processing system application 144). In some instances, at least a portion of the platform is typically configured to reside on the entity system 106 (for example, at the entity resource application 168). In some instances, at least a portion of the enhanced communication platform is typically configured to reside on the first user device 104 (for example, at the first user device application 122), on and/or on other devices (e.g., VR composite credential devices 160). Furthermore, the platform is capable of seamlessly integrating a virtual reality (VR) space and composite plans with dynamic user modification and transformation based on accommodation factors and is typically infinitely customizable by the system 108 and/or the user 102.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the entity system 106 and one or more of the VR composite credential devices 160, (for example, based on receiving an audio user input, gesture input, etc.), as illustrated by communication channel 101a. Therefore, the system, via the network 101 may establish, operative connections between otherwise incompatible devices, for example by establishing a communication channel 101a between the entity system 106 and the VR composite credential devices 160. In this regard, the network 101 (and particularly the communication channels 101a) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, against an appropriate portion of the entity system device 160 or it may include only waving or holding the external apparatus near an appropriate portion of the entity system device without making physical contact with the entity system device.

In some embodiments, the first user 102 is an individual that wishes to conduct an accommodation mobility activity with the entity system 106 for the purposes of dynamic processing of spatial component parameters based on detecting accommodation factors in real time. For conducting the accommodation mobility activity requested by the first user 102, in some embodiments, the entity system 106 and/or the processing system 108, may construct and present a construct a first immersive virtual simulation structure associated with a first physical location sector, via VR composite credential devices 160. Hereinafter, the term "application" is used to refer to an application (e.g., application 122, application 168, application 144, etc.), a widget, a webpage accessed through a browser, and the like. In some embodiments the application is a processing system application 144, stored on the processing system 108, configured for performing one or more steps described herein. In some embodiments the application is an entity resource application 168, stored on the entity system 106. In some embodiments the user application is a first user device application 122, referred to as a user application 122 herein, stored on the first user device 104. In some embodiments the application 122 may refer to a third party application or another user application stored on a cloud accessed by the processing system 108 and/or the VR composite credential devices 160 through the network 101. In some embodiments, at least a portion of the processing system application 144 may be stored on the memory device 140 of the processing system 108, and the graphical user interfaces (e.g., integrated/composite user interfaces) maybe presented on display devices (e.g., screens, monitors, computers, tablets, smart devices etc.) of the VR composite credential devices 160. The user 150 may subsequently navigate through the interface, perform one or more accommodation mobility activities using the interface.

FIG. 1 also illustrates the first user device 104. The first user device 104 herein refers to one or more user devices, wherein each device may generally comprise a communication device 110, a display device 112, a geo-positioning device 113, a processing device 114, and a memory device 116. The first user device 104 is a computing system that allows a user 102 to interact with other systems to conduct communication sessions, initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 106, the VR composite credential devices 160 and/or the processing system 108. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the user interface. The geo-positioning device 113 may comprise global positioning system (GPS) devices, triangulation devices, accelerometers, and other devices configured to determine the current geographic location of the first user device 104 with respect to VR composite credential devices 160, satellites, transmitter/beacon devices, telecommunication towers and the like. In some embodiments the first user device 104 may include authentication devices. In some embodiments the first user device 104 may include speakers, microphones and the like.

The first user device 104 comprises computer-readable instructions 120 stored in the memory device 116, which in one embodiment includes the computer-readable instructions 120 of the first user device application 122. As discussed previously, the first user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120, when executed by the processing device 114 are configured to cause the first user device 104 and/or processing device 114 to perform one or more steps, or to cause other systems/devices to perform one or more steps described herein.

FIG. 1 further illustrates one or more VR composite credential devices 160, in operative communication with each other and with systems and devices of the network 101. The one or more VR composite credential devices 160 may comprise peripheral devices such as headsets, speakers, microphones, smart speakers, VR input/output devices (e.g., tactile type devices such as handheld motion controllers, headsets), non-tactile type VR sensors, and the like, display devices such as screens, monitors, touchscreens, and the like, desktop personal computers, a mobile system, such as a cellular phone, smart phone, and the like, personal data assistant (PDA) devices, laptops, wearable devices, a smart TV, a smart speaker, a home automation hub, augmented/virtual reality devices, cameras/visual capture devices, proximity sensors, beacon devices, or the like. A non-limiting schematic representation of a VR composite credential device 160 will be described with respect to FIG. 2 later on.

In some embodiments, some or all of the VR composite credential devices 160 may be stand-alone devices that are configured to facilitate the accommodation mobility activity, at least in part, and detect and capture VR composite credentials such as VR spatial movement and position credentials. In this regard, in some instances, the VR composite credential device 160 is configured to be coupled to, or establish operative communication with an entity system 106, such that the user 102 may conduct an accommodation mobility activity via the VR composite credential device 160 and/or the entity system 106. Here, the VR composite credential device 160 may be configured establish communication with other systems via network 101, either directly or via the entity system 106.

In other instances the VR composite credential device 160 may be integral with the entity system 106. Therefore, the entity system 106 may refer to one or more devices (e.g., resource processing devices or transaction terminal devices) that are configured to be associated with or connected to the VR composite credential device 160, that are associated or connected to a VR composite credential device 160 and/or that comprise the VR composite credential device 160. The entity system 106 may comprise an ATM 120a, a resource terminal 120b (e.g., a point of sale terminal 120b), a user device 120c, vending machines and/or other devices that are configured to facilitate the user activity. The user device 120c may be one of the user devices 104 and may comprise a mobile communication device, such as a cellular telecommunications device (i.e., a smart phone or mobile phone), a computing device such as a laptop computer, a personal digital assistant (PDA), a mobile Internet accessing device, or other mobile device including, but not limited to portable digital assistants (PDAs), pagers, mobile televisions, entertainment devices, laptop computers, cameras, video recorders, audio/video player, radio, GPS devices, any combination of the aforementioned, or the like.

As further illustrated in FIG. 1, the processing system 108 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity system 106, the first user device 104, the physical location sector database 180, and VR composite credential devices 160. As such, the communication device 136 generally comprises a modem, server, wireless transmitters or other devices for communicating with devices on the network 101.

As further illustrated in FIG. 1, the processing system 108 comprises computer-readable instructions 142 stored in the memory device 140, which in one embodiment includes the computer-readable instructions 142 of a processing system application 144 (also referred to as a "system application"). The computer readable instructions 142, when executed by the processing device 138 are configured to cause the system 108/processing device 138 to perform one or more steps described in this disclosure to cause out systems/devices to perform one or more steps described herein. In some embodiments, the memory device 140 includes a data storage for storing data related to user activities/transactions and resource entity information, but not limited to data created and/or used by the processing system application 144.

As further illustrated in FIG. 1, the entity system 106 (substantially similar to the processing system 108) generally comprises a communication device 162, at least one processing device 164, and a memory device 166. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 164 is operatively coupled to the communication device 162 and the memory device 166. The processing device 164 uses the communication device 162 to communicate with the network 101 and other devices on the network 101, such as, but not limited to the processing system 108, the first user device 104, the external distributed systems 180, and VR composite credential devices 160. As such, the communication device 162 generally comprises a modem, server, wireless transmitters or other devices for communicating with devices on the network 101.

As further illustrated in FIG. 1, the entity system 106 comprises computer-readable instructions 167 stored in the memory device 166, which in one embodiment includes the computer-readable instructions 167 of a processing system application 168 (also referred to as a "system application"). The computer readable instructions 167, when executed by the processing device 164 are configured to cause the system 108/processing device 164 to perform one or more steps described in this disclosure to cause out systems/devices to perform one or more steps described herein. In some embodiments, the memory device 166 includes a data storage for storing data related to user activities/transactions and resource entity information, but not limited to data created and/or used by the processing system application 168. Although indicated as being separate systems, in some embodiments, the processing system 108 and the entity system 106 may be embodied in a single system.

FIG. 1, further illustrates physical location sector database 180 which is structured for storing composite plan files, structural parameters and spatial component data associated with physical location sectors, storing modifications of spatial component parameters in a virtual reality (VR) space and reasons thereof, and/or the like, at least in part, for example via native interfaces thereof.

In the embodiment illustrated in FIG. 1, and described throughout much of this specification, a "system" or the "processing system 108" or the "system 108" is configured for performing one or more steps described herein, either alone or in conjunction with the entity system 106, one or more VR composite credential devices 160, first user device 104, physical location sector database 180 and the like.

Referring now to FIG. 2, one embodiment of the VR composite credential device 160 is illustrated. The VR composite credential device 160 is structured for capturing, customizing and transforming one or more VR composite credentials of a user and authenticating and performing accommodation mobility activities based on at least the VR composite credentials. In accordance with the embodiments of the invention, the term "VR composite credentials" may refer to spatial movement and position credentials of the user's body and of VR composite credential capture devices (specifically VR composite credential capture devices of a tactile type).

As discussed previously, the one or more VR composite credential devices 160 may comprise tactile type devices such as handheld motion controllers, headsets, smart glasses, tactile type VR sensors (e.g., gyroscopes, accelerometers, magnetometers, etc.) other handheld devices, other wearable devices, and/or the like. The one or more VR composite credential devices 160 may comprise non-tactile type devices such as speakers, microphones, smart speakers, a home automation hub, proximity sensors, beacon devices, other non-tactile type VR sensors (e.g., optical sensors 250a, ultrasonic sensors 250b, motion sensors 250e, image capture devices 270 such as cameras, structured light systems, magnetometers, and/or the like). The one or more VR composite credential devices 160 may comprise display devices such as screens, monitors, touchscreens, and the like.

In some embodiments, the spatial movement and position credentials may refer to the position, location, movement, gestures and/or the like of the user's phalanges, i.e., the user's hand(s) and/or finger(s), the tracking of movement of the user's eyes, and/or the like. In some embodiments, the spatial movement and position credentials may refer to the position, location, movement, gestures and/or the like of other body parts of the user such as the user's feet, arms, head, legs, etc. In some embodiments, the VR composite credentials may refer to a combination of spatial movement and position credentials of the user and of the VR composite credential capture devices associated with the user with respect to an immersive virtual simulation structure environment, and/or one or more other credentials of the user such as (i) a facial image credential, (ii) a user voice credential, and/or (iii) a user verbal phrase credential. In some embodiments the one or more other credentials may further comprise iris scans/tracking, retina scans/tracking, and/or the like. In some embodiments, the VR composite credentials are non-tactile, i.e., not based on touch or contact between the user and components/devices for capturing the credentials.

The VR composite credential device 160 is typically configured to receive VR composite credentials from the user 102. In this regard, the VR composite credential device 160 may comprise one or more composite credential sensor devices 250. The one or more composite credential sensor devices 250 are configured to retrieve, receive, analyze and or validate VR composite credentials associated with the user. Here, the one or more composite credential sensors 250 may comprise (i) one or more VR spatial sensor devices configured for capture and imaging of VR spatial movement and position credentials, and (ii) one or more auxiliary sensor devices configured for capturing other credentials of the user such as a facial image credential, a user voice credential, and/or a user verbal phrase credential.

In this regard, one or more VR spatial sensor devices may comprise optical sensors 250a, ultrasonic sensors 250b, capacitance sensors 250c, motion sensors 250e, image capture devices 270 such as cameras, and/or the like, which singularly or in combination capture spatial movement and position type VR composite credentials. The one or more one or more VR spatial sensor devices may further comprise radio frequency, thermal, pressure, piezoresistive/piezoelectric, microelectromechanical sensors, and the like. Moreover, the sensor devices 250 may comprise optical sensors 250a, ultrasonic sensors 250b, capacitance sensors 250c, sound sensors 250d (e.g., sound/audio capture devices), gyroscopes, accelerometers, magnetometers, fingerprint scanners, iris scanners, etc.

The one or more composite credential sensors 250, either singularly or in combination may be configured to recognize/receive the VR composite credentials of the user and also determine one or more credential parameters associated with the VR composite credentials. Credential parameters typically comprise characteristics of the VR composite credentials provided by the user. In this regard, determining credential parameters may comprise determining positioning and orientation of the phalanges/fingers/hands of the user and/or handheld tactile type VR composite credential devices 160' (e.g., by determining one or more mechanical degree of freedom coordinate parameters 320 thereof, as illustrated in FIGS. 3B-3C), identifying the fingers/hands, determining a sequence and/or timing of the movement thereof (e.g., by determining and tracking the paths traced by one or more mechanical degree of freedom coordinate parameters 320, as illustrated in FIGS. 3B-3C), determining gestures formed by the user, determining dimensional parameters (distance between the hands, distance between a hand and the head, distance between the handheld tactile type VR composite credential devices 160', distance between a handheld tactile type VR composite credential device 160' and the head and/or the hand, etc.), determining symbols traced by the movement of the movement of the user's hands and/or handheld tactile type VR composite credential devices 160' (e.g., by determining and tracking the paths traced by one or more mechanical degree of freedom coordinate parameters 320 of the hands and/or handheld tactile type VR composite credential devices 160', as illustrated in FIG. 3C), and/or the like.

In some embodiments, the phalangeal credential sensor 250 comprises an interface for the user to provide VR composite credentials. In some embodiments, the one or more phalangeal credential sensors may comprise a common interface for receiving the credentials, while in other embodiments the phalangeal credential sensors may comprise multiple interfaces. In some instances, the interface takes the form of a screen of predetermined dimensions for the users and the screen may display whether or not the user's hands or other body parts, and/or the handheld tactile type VR composite credential devices 160' are correctly located within the capture region 330 (also referred to as a display region 330 associated with the first immersive virtual simulation structure 350). In some embodiments, this screen may be the display device 230. This screen may be connected to one or more composite credential sensors 250, such that the sensors 250 may the VR composite credentials and the credential parameters. The screen may be manufactured from any suitable material or a combination of materials, for example glass, plastics, metals, crystals (such as laser-cut sapphire crystal to preclude scratches), composites, non-metals and the like. In some instances, the screen comprises a detection interface such that it is configured to detect the user's fingers/phalanges even when the user is not pressing on the screen or even when the user is not applying the predetermined pressure required for conventional fingerprint scanners when placing his/her fingers on the screen for retrieval of VR composite credentials. In some instances, as discussed above, the interface takes the form of a contactless interface that is configured to retrieve one or more VR composite credentials and/or determine one or more credential parameters without physical contact between the user's phalanges/fingers and the interface. In this regard, the contactless interface may employ light waves, radio waves, and ultrasonic waves.

Optical sensors 250a typically involve optical imaging of the features of the user's phalanges/fingers/hands or other body parts using visible light. For example, the optical sensor 250a may capture a digital image of a phalanges/fingers/hands or other body parts (and/or the handheld tactile type VR composite credential devices 160'). Multiple images may be generated in a predetermined frequency to determine the pattern or movement paths of the user's phalanges/fingers/hands or other body parts and/or the handheld tactile type VR composite credential devices 160'. In other embodiments, the optical sensor 250a may comprise an interface or terminal containing near-infrared LED (light-emitting diode) light and a monochrome CCD camera.

Ultrasonic sensors 250b typically involve creating visual images of the VR composite credentials using high frequency sound waves. The high frequency sound waves may be generated using piezoelectric transducers. Capacitance Sensors 250c typically involve capturing images of the VR composite credentials using the properties of a parallel plate capacitor. The capacitance sensors 250c typically comprise sensor array pixels that each act as one plate of a parallel plate capacitor, while the electrically conductive dermal layer of skin acts as the second plate of the parallel plate capacitor. The capacitance sensor 250c is configured to determine the varying capacitance between the valleys and ridges of the dermal layer to generate the image, such as a fingerprint. The change in measured capacitance may also be utilized to determine credential parameters. The capacitance sensors 250c may comprise active and/or passive capacitance sensors.

Sound sensors 250d may comprise sound/audio capture devices, voice recognition devices, microphones, and/or the like. Motion sensors 250e may comprise geolocation sensors (e.g., GPS sensors), accelerometer sensors, pedometer sensors, tilt sensors, gravimeter sensors, inclinometer sensors, gyroscopes, and/or other sensors/devices which, singularly or in combination, determine motion (and its parameters such as direction, speed, acceleration, path, etc.), orientation, positioning, location and/or the like of the user, the user's body parts (e.g., hands etc.), and/or the handheld tactile type VR composite credential devices 160'.

In some embodiments, the VR composite credential device 160 may be a wearable device associated with the user. In this regard, the VR composite credential device 160 may comprise a VR headset, a VR handheld controller, a smartwatch, a game controller, and/or the like, and/or mobile devices, portable devices, and/or the like. In some embodiments, the positioning system device 275 of the VR composite credential device 160 may comprise GPS devices, accelerometers, and/or the like.

The VR composite credential device 160 may further include various features, such as a processor 210, such as a processing device or a microprocessor, communicably coupled to the composite credential sensors 250, a memory device 220, user output devices 236, user input devices 240, a network communication interface 260 comprising a communication device 271, and/or a power source 215. Optionally, in other embodiments, the processor 210 may be coupled to other features of the VR composite credential device 160 such as an image capture device 270, a positioning system device 275, and the like. In the embodiments where the VR composite credential device 160 is integral with the entity system 106, the memory device 220 may refer to the memory device 166, the processor 210 may refer to the processing device 164, and the network communication interface 260 may refer to the communication device 162. In some embodiments, the user output devices 236 may comprise one or more display devices 230 and one or more speaker devices 232.

Typically, the communication device 271 of the network communication interface 260 is configured to establish operative communication between the VR composite credential device 160 and the processing device 164 of the entity system 106. In this regard, the communication interface 260 comprises a transmitter 274, a receiver 272 to transmit and receive signals from corresponding devices of the communication device 124 of the entity system 106 via a suitable transmission medium or a communication channel. In some embodiments, the stand-alone VR composite credential device 160 is configured to be coupled/connected to the entity system 106 via wired communication channel. For example, the communication device 271 may comprise a plug that may be inserted into a complementary port on entity system 106. In other embodiments, the stand-alone VR composite credential device 160 is configured to be coupled/connected to the entity system 106 via a wireless and/or contactless communication channel. In this regard, the wireless communication channel may comprise near field communication (NFC), communication via radio waves, communication through the internet, communication via electromagnetic waves and the like. In one embodiment, the entity system 106 may include a transceiver, i.e., one or more antennas 276 and and/or other electronic circuitry, devices, and software, for receiving VR composite credential data when the VR composite credential device 160 is held close to or tapped at a suitable location of the entity system 106. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 at the mobile device may transmit and receive radio frequency signals, respectively, from the entity system 106 within a distance of up to approximately 25 cm, and preferably from 0-20 cm, such as from 0-15 cm, 0-2 m, and 0-10 m.

Establishing the communication channels may also include signaling information in accordance with the air interface standard of the applicable cellular system of the wireless telephone network that may be part of the network 101. In this regard, the VR composite credential device 160 may be configured to operate with one or more air interface standards, communication protocols, modulation types, and access types. By way of illustration, the VR composite credential device 160 may be configured to operate in accordance with any of a number of first, second, third, and/or fourth-generation communication protocols and/or the like. For example, the VR composite credential device 160 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The VR composite credential device 160 may also be configured to operate in accordance with non-cellular communication mechanisms, such as via a wireless local area network (WLAN) or other communication/data networks.

The functions, and features of the enhanced communication platform will now be described in detail. As such, the immersive, integrated/composite VR interface described herein, in some embodiments, is configured to function as an intelligent personal assistant and resource navigator and is configured to perform one or more accommodation mobility activities, by harnessing the functionality of multiple VR composite credential devices 160, without requiring the user to access and navigate multiple interfaces one after another. In particular, the system is configured to construct and present an immersive virtual simulation structure, which is customized, in real-time, in accordance with user interaction and user view zones during the session, for dynamic processing of spatial component parameters based on detecting accommodation factors in real time.

Moreover, in some embodiments, the immersive virtual simulation structure is presented, in real-time, based on determining optimal devices (e.g., display 230 of the at least one VR composite credential capture device 160, display device 112 of the user device 104, and/or the like) for presentation and optimal modes of presentation, thereby transforming the communication session by harnessing the functionality of a variety of distinct devices. The optimal devices and modes of presentation are further correlated with user characteristics such as user location and user view zones to provide a real-time transformation of the presentation of the interfaces customized based on current user characteristics. As such, the system is configured to employ the foregoing technical features of the enhanced communication platform to perform a myriad of accommodation mobility activities. The various functions and features of the invention will now be described. It is understood that these functions and features employ some or all of the aforementioned technical features.

Referring now to FIG. 3A illustrating a block diagram illustrating a high level process flow 300A for dynamic capture, analysis and modification of spatial component parameters in a virtual reality (VR) space and real-time transformation to composite plan files, in accordance with an embodiment of the invention. FIG. 3B illustrates a top view schematic representation 300B of an immersive virtual simulation structure environment and VR composite credential capture associated with user(s), in accordance with an embodiment of the invention. FIG. 3C illustrates a side view schematic representation 300C of the immersive virtual simulation structure environment and VR composite credential capture associated with user(s) of FIG. 3B, in accordance with an embodiment of the invention. FIG. 3D illustrates a schematic representation 300D of a user interface 302 presenting a first plan file 310, in accordance with an embodiment of the invention. FIG. 3E illustrates a schematic representation 300E of a presentation of first immersive virtual simulation structure, in accordance with an embodiment of the invention. In some embodiments, the "system" as used henceforth, may refer to the processing system 108, such that the processing system 108 may perform some of all the steps of process flow 300A herein. In other embodiments, the "system" may refer to the processing system 108, in conjunction with the entity system 106, the VR composite credential device 160 and/or other systems that are configured to initiate one or more steps of the process flows described herein. The steps of the process flow 300A will be described with respect to the non-limiting illustrative examples illustrated in FIGS. 3B-3E.

As discussed previously, the physical location sectors may comprise, a building/dwelling (e.g., a building structure), a portion of the building/dwelling, a floor associated with a building/dwelling, a portion of a floor associated with a building/dwelling, a combination of a plurality of rooms of the building/dwelling, a room of the building/dwelling and/or the like. Typically, each physical location sector comprises one or more physical spatial components such as one or more floors, roofs, walls, load bearing structures (e.g., beams, pillars, joists, etc.), entrances and exits (e.g., doorways, doors, etc.), windows, fixtures, furniture, walkways, corridors, stairs, elevators, variations in a contour of the floor (e.g., slope, a protrusion in the floor, a depression in the floor, and/or the like), and/or other physical structures and items. Here, the one or more physical spatial components may be associated with one or more structural parameters. Moreover, the three-dimensional arrangement of the one or more physical spatial components within the physical location sector may be referred to as a layout of the physical location sector.

At block 302A, the system typically constructs a first immersive virtual simulation structure 350 associated with a first physical location sector 10 (e.g., a room, a floor, a building, etc.) having one or more physical spatial components 12. Typically, the first immersive virtual simulation structure 350 is structured such that it reflects a 1:1 simulation of the physical location sector. In this regard, the system constructs the simulated mobility impeding structures 352 within the first immersive virtual simulation structure 350. Typically, each simulated mobility impeding structure 352 is a simulation of and is associated with a respective physical spatial component 12 (e.g., as illustrated by FIG. 3E). Typically, the immersive virtual simulation structure may be constructed to present a 1:1 simulation of the physical location sector to the participating user.

At block 302D, the system may present, via a user display device, the first immersive virtual simulation structure 350 to the user 102. Here, the first immersive virtual simulation structure 350 is presented in a manner to offer an immersive experience to the participating user 102, with the immersive virtual simulation structure 350 being presented in a 360° view around a physical location of the user. Typically, a scale of the presented immersive virtual simulation structure 350 is dynamically modified such that a ratio of a dimensional parameter of the user and a corresponding dimensional parameter of the immersive virtual simulation structure 350 is 1:1, as illustrated by the non-limiting example of FIG. 3E. In this regard, the first immersive virtual simulation structure 350 is presented such that a first location (e.g., location 3 illustrated in FIG. 3B) is within the first immersive virtual simulation structure 350. Here, the system may determine that the user 102 is within a display region 330 (also referred to as capture region 330) associated with the first immersive virtual simulation structure 350 associated with the first physical location sector 10. In this regard, the system may transmit control signals to the at least one VR composite credential capture device 160, display 230 of the at least one VR composite credential capture device 160, display device 112 of the user device 104, and/or the like, tactile type VR composite credential devices 160' (e.g., headset) to singularly or collectively present the first immersive virtual simulation structure 350. FIG. 3E illustrates a non-limiting example of the presentation of the first immersive virtual simulation structure 350 to the user 102.

For adapting and customizing the first immersive virtual simulation structure 350 to the users' accommodation factors and mobility devices, the system may first trigger, using the one or more composite credential sensor devices 250 of the at least one VR composite credential capture device 160, capture of one or more VR composite credentials of the user 102 at a first time (e.g., at block 302C). The system may then analyze the captured one or more VR composite credentials of the user 102 at the first time. The system may determine a first accommodation factor associated with the user 102, Here, the first accommodation factor is associated with mobility of the user 102 at the first physical location sector 10, such as movement, vision, and/or the like. The system may then determine a first mobility assist device 90 associated with the user 102. Here, the first mobility assist device 90 is associated with facilitating mobility of the user 102 at the first physical location sector 10, such as a wheelchair, crutches, a cane, sonar navigation device, seeing-eye dog, and/or the like. In accordance with the first accommodation factor, and/or the first mobility assist device 90, the system may dynamically modify the display region 330 (also referred to as capture region 330) to an adapted display region 330' (also referred to as adapted capture region 330') such that a current user view zone matches the adapted display region 330' (also referred to as adapted capture region 330'). Here, the system may first determine that, based on first mobility assist device 90, that the initial display region 330 (also referred to as capture region 330) does not match the current user view zone. In response, the system may construct the first immersive virtual simulation structure 350 to be compatible with the adapted display region 330' (also referred to as adapted capture region 330') such that a current user view zone matches the adapted display region 330' (also referred to as adapted capture region 330').

In some embodiments, the adapted display region 330' (also referred to as adapted capture region 330') may relate to movement factors. The user can navigate thru the simulation of the physical location sector in a physical mobility assist device to determine accessibility, heights, flooring, etc. Alternatively, the invention may construct a simulated mobility assist device to determine accessibility, heights, flooring, etc. Users may then navigate through paths in the simulation of the physical location sector to ensure it is accessible, usable, and that it incorporates best practices (e.g., ensuring that a user with a mobility assist device can access an ATM fully without hitting a wall). In this regard, in some embodiments, the adapted display region 330' (also referred to as adapted capture region 330') may relate to movement factors, as will be described in detail below with respect to adapting the cartesian coordinate system to match the user view zone in accordance with the mobility assist device. In some embodiments, the adapted display region 330' (also referred to as adapted capture region 330') may relate to vision factors. Here, the system may construct the adapted display region to mimic the vision of the user in the physical space. As a non-limiting example, the present invention may allow for analysis of a physical location sector for a user with visual accommodation factors, e.g., checking for Braille, or a new type of QR code, (e.g., associated with a navigation guidance system), and to ensure they are able to navigate independently without any impediments. In some embodiments, the adapted display region 330' (also referred to as adapted capture region 330') may relate to auditory factors. Here, the system may construct the adapted display region to mimic the auditory factors of the user in the physical space. As another non-limiting example, the present invention may allow for analysis of a physical location sector for a user with auditory accommodation factors, e.g., to ensure users are notified of all alarms, communications, messages, and/or the like. In this manner, the system may tailor the presentation of the first immersive virtual simulation structure 350 to particular accommodation factors and/or associated mobility assist devices associated with a user.

Moreover, the system may determine a first mobility impeding structure 354 of the plurality of simulated mobility impeding structures 352 of the first physical location sector 10, at block 302E. In this regard, the system may dynamically track the user's navigation through paths in the first immersive virtual simulation structure 350 with respect to the plurality of simulated mobility impeding structures 352. In some embodiments, the system may determine that the first mobility impeding structure 354 of the plurality of simulated mobility impeding structures 352 is likely to impede movement/mobility of the user, in response to determining that (i) at least a portion of the user's body and/or at least a portion of the user's mobility assist device intersects the first mobility impeding structure 354 or another simulated mobility impeding structure 352, when the user is traversing along a path within the first immersive virtual simulation structure 350, and/or (ii) that there is no other possible way of traversal along the path that does not lead to the intersection of at least a portion of the user's body and/or at least a portion of the user's mobility assist device with the first mobility impeding structure 354 or another simulated mobility impeding structure 352. In some embodiments, the system may determine that the first mobility impeding structure 354 of the plurality of simulated mobility impeding structures 352 is likely to impede movement/mobility of the user, in response to determining that the first mobility impeding structure 354 or another simulated mobility impeding structure 352 is likely to interfere, slow down, hinder or otherwise impede the user's traversal or the mobility assist device's traversal along a path within the first immersive virtual simulation structure 350. As a non-limiting example illustrated in FIG. 3E, the system may determine that the user's traversal along a path portion 62 of path 60 is impeded by a first mobility impeding structure 354 of a desk type.

At block 302C, to determine that the user's mobility is not hindered when traversing the a first immersive virtual simulation structure 350 associated with the first physical location sector 10, and to determine any modifications/reconfigurations performed by the user, the system typically captures one or more VR composite credentials using the at least one VR composite credential capture device 160 and/or one or more composite credential sensor devices 250. In this regard, the system may transmit control signals to the at least one VR composite credential capture device 160 and/or the one or more composite credential sensor devices 250, which are configured to cause the one or more composite credential sensor devices 250 to capture the one or more VR composite credentials of the user.

As outlined previously, in this regard, determining credential parameters may comprise determining positioning and orientation of the phalanges/fingers/hands of the user and/or handheld tactile type VR composite credential devices 160' (e.g., by determining one or more mechanical degree of freedom coordinate parameters 320 thereof, as illustrated in FIGS. 3B-3C), identifying the fingers/hands, determining a sequence and/or timing of the movement thereof (e.g., by determining and tracking the paths traced by one or more mechanical degree of freedom coordinate parameters 320, as illustrated in FIGS. 3B-3C), determining gestures formed by the user, determining dimensional parameters (distance between the hands, distance between a hand and the head, distance between the handheld tactile type VR composite credential devices 160', distance between a handheld tactile type VR composite credential device 160' and the head and/or the hand, etc.), determining symbols traced by the movement of the movement of the user's hands and/or handheld tactile type VR composite credential devices 160' (e.g., by determining and tracking the paths traced by one or more mechanical degree of freedom coordinate parameters 320 of the hands and/or handheld tactile type VR composite credential devices 160', as illustrated in FIG. 3C), and/or the like. As such, the VR composite credential device 160 may comprise the sensors 250 for scanning/identifying/determining the user's body portions and their parameters (one or more phalanges/fingers and/or hand of the user, the user's head, the user's limbs, feet, etc.). In some embodiments, the VR composite credentials may refer to a combination of spatial movement and position credentials of the user and of the VR composite credential capture devices associated with the user with respect to an immersive virtual simulation structure environment, and/or one or more other credentials of the user such as (i) a facial image credential, (ii) a user voice credential, and/or (iii) a user verbal phrase credential. The system may associate the credential or combination of credentials (e.g., a gesture or a combination of a gesture and voice command) with the modification or reconfiguration to the spatial component parameters associated with physical location sector desired by the user, automatically, and in real-time.

Specifically, in the non-limiting example illustrated in FIGS. 3B and 3C, the VR composite credential device 160 may comprise a plurality of sensors 250 and/or tactile type VR composite credential devices 160'. Each of the sensors 250 or the sensors 250 (themselves or together with the tactile type VR composite credential devices 160') collectively may define a capture region 330. For instance, the capture region may be 0.5 to 100 cubic feet, 1 to 200 cubic feet, and/or the like. As such, the sensors 250 may scan/identify/determine the user 102's body portions (one or more phalanges/fingers and/or hand of the user, the user's head, the user's limbs, feet, etc.) positioned appropriately proximate to the composite credential sensors 250 (e.g., within a predetermined range of 1-5 feet etc.) and/or in the predetermined capture region 330 proximate the composite credential sensors 250. FIGS. 3B and 3C illustrate the user being located within the predetermined capture region 330. As another example, "location 3" may fall within the predetermined capture region 330 as illustrated. However, upon determining that the user 102 or a portion of the user's body (e.g., right hand 22) fall outside the predetermined capture region 330 (e.g., at "location 1" or "location 2" as illustrated), the system may request the user to reposition such that the user is located within the predetermined capture region 330.

In this regard, the user 102 may provide VR composite credentials in the form of spatial movement and position credentials by (i) positioning the right hand 22 (and/or fingers of the right hand 22) in a particular position, (ii) forming a particular gesture with the right hand 22 (and/or fingers of the right hand 22), (iii) moving the right hand 22 (and/or fingers of the right hand 22) simultaneously, consecutively, in a pattern, in a predetermined sequence, (iv) moving the right hand (and/or fingers of the right hand 22) to trace a particular symbol/shape, consecutively, in a pattern, in a predetermined sequence, (v) positioning one or more tactile type VR composite credential devices 160' in a particular position, (vi) forming a particular gesture with one or more tactile type VR composite credential devices 160', (vii) moving multiple tactile type VR composite credential devices 160 simultaneously, consecutively, in a pattern, in a predetermined sequence, and/or (viii) moving one or more tactile type VR composite credential devices 160' to trace a particular symbol/shape, consecutively, in a pattern, in a predetermined sequence, and/or the like. Similarly, the user 102 may provide VR composite credentials in the form of spatial movement and position credentials using other body parts of the user such as the user's left hand 24, the user's head 26, and/or the like. In some embodiments, the VR composite credentials in the form of spatial movement and position credentials may comprise credentials provided using a combination of body parts, e.g., provided using both the hands 22-24, provided using the right hand 22, and the head 26, a specific combination of fingers, etc. The composite credential sensors 250 are typically configured to identify, recognize, and/or analyze the VR composite credentials provided in the aforementioned ways. The composite credential sensors 250 are also typically configured to identify, recognize, and/or analyze the VR composite credentials associated with other body parts of the user such as the user's arms, legs, feet, torso, face, etc. The biometric type sensors 250 may also capture biometric credentials such as voice phrase, iris scans, face scans, etc. in a similar manner. The system may associate the credential or combination of credentials (e.g., a gesture or a combination of a gesture and voice command) with the modification or reconfiguration to the spatial component parameters associated with physical location sector desired by the user, automatically, and in real-time.

The one or more composite credential sensors 250, either singularly or in combination may be configured to recognize/receive the VR composite credentials of the user and also determine one or more credential parameters associated with the VR composite credentials. Credential parameters typically comprise characteristics of the VR composite credentials provided by the user. In this regard, determining credential parameters may comprise determining positioning and orientation of the phalanges/fingers/hands of the user and/or tactile type VR composite credential devices 160' (e.g., by determining one or more mechanical degree of freedom coordinate parameters 320 thereof), identifying the fingers/hands, determining a sequence and/or timing of the movement of the user's hands and/or fingers and/or tactile type VR composite credential devices 160' (e.g., by determining and tracking the paths traced by one or more mechanical degree of freedom coordinate parameters 320 thereof), determining gestures formed by the user's hands/fingers and/or tactile type VR composite credential devices 160', determining dimensional parameters (such as size of hands, distance between the hands, distance between a hand and the head, between the head and a tactile type VR composite credential device 160, etc.), determining symbols traced by the movement of the movement of the user's hands and/or fingers, and/or tactile type VR composite credential devices 160' (e.g., by determining and tracking the paths traced by one or more mechanical degree of freedom coordinate parameters 320 thereof), and/or the like.

In this regard, in some embodiments, the system may establish a coordinate system predetermined capture region 330. FIGS. 3B-3C illustrate a cartesian coordinate system having mutually perpendicular axes X, Y, and Z, which intersect at an origin "O". It is noted that other coordinate systems such as polar coordinate systems may also be employed in alternative embodiments. The location/positional coordinates of the user's right hand 22 at a first time may be indicated by cartesian positional parameters A (X1, Y1, Z1) with X1 representing the distance from the X-axis, Y1 representing the distance from Y-axis and Z1 representing the distance from the Z-axis. The system may similarly determine cartesian positional parameters B (X2, Y2, Z2) of the user's left hand 22, the user's head 26, etc. The cartesian positional parameters may also be referred to as spatial position-movement credentials or spatial position credentials.

Moreover, for adapting and customizing the first immersive virtual simulation structure 350 to accommodation factors and mobility devices of another user 102', the system may create a new coordinate system for the adapted capture region 330', e.g., for emulating a view experience by a user in a mobility assist device. FIG. 3C illustrates an adapted cartesian coordinate system having mutually perpendicular axes X', Y' (not illustrated), and Z', which intersect at an origin "O'" such that the adapted cartesian coordinate system is compatible with the adapted capture region 330', the first accommodation factor, and the first mobility assist device 90. Here, the system may similarly determine cartesian positional parameters C (X3, Y3, Z3) and D (X4, Y4, Z4) of the tactile type VR composite credential devices 160' with respect to the adapted capture region 330' and adapted cartesian coordinate system.

The one or more mechanical degree of freedom coordinate parameters 320 (also referred to as spatial position-movement credentials or spatial movement credentials) may refer to independent parameters that define the configuration or state of the user's body portions. In some embodiments, the one or more mechanical degree of freedom coordinate parameters 320 may define the position and orientation of the user's body portions and/or the tactile type VR composite credential devices 160 in space. As such, the one or more mechanical degree of freedom coordinate parameters 320 may comprise three translational parameters and three rotational parameters. The one or more mechanical degree of freedom coordinate parameters 320 may be determined with respect to the coordinate system. For instance, with respect to the illustrated cartesian coordinate system, the one or more mechanical degree of freedom coordinate parameters 320 may comprise a first translational parameter along the X-axis, a second translational parameter along the Y-axis, third translational parameter along the Z-axis, a first rotational parameter along the X-axis (e.g., parameter R1 illustrated in FIG. 3D), a second rotational parameter along the Y-axis, and/or third rotational parameter along the Z-axis (e.g., parameter S1 illustrated in FIG. 3D). It is noted that, the system may determine that one or more of these degree of freedom coordinate parameters may be constrained for a particular body portion (e.g., the wrist may be rotated only along a particular rotational axis and not all 3), and subsequently the system may decrease the number of mechanical degree of freedom coordinate parameters 320 determined. The system may track the movement ((a) translation and (b) rotation) of the user's right hand 22 from A (X1, Y1, Z1) at the first time to another position A' (X1', Y1', Z1') at a subsequent second time (not illustrated). In this regard, the system may construct vectors and vector paths relating to the translation of the user's right hand 22 and rotation of the user's right hand 22 mapping the movement and path followed from A (X1, Y1, Z1) at the first time to another position A' (X1', Y1', Z1') at a subsequent second time. Here, the vectors represent the movement along the degrees of freedom, e.g., translation along the X-axis, translation along the Y-axis, translation along the Z-axis, rotation along the X-axis, rotation along the Y-axis, and/or rotation along the Z-axis.

In this manner, using the cartesian positional parameters, the system my further determine one or more dimensional parameters such as a size parameter and/or a distance parameter. The size parameter may comprise a maximum width of the user's hand, a maximum width of the user's head, and/or the like. The system may determine the size parameter as a Euclidean distance between the extreme points of the body portion being analyzed. The distance parameter may comprise a distance between (i) two body portions of the user, and/or (ii) a body portion of the user and one/or more sensors 250. The system may determine the distance parameter as a Euclidean distance between the points of the body portions being analyzed. For example, the system may determine a distance parameter "L1" reflecting a distance between the right hand 22 and the left hand 24 of the user 102. Similarly, the system may determine a distance parameter "L2" reflecting a distance between the right hand 22 and the head 26 of the user 102.

Similarly, using the positional parameters and the one or more mechanical degree of freedom coordinate parameters 320, the system may trace the path followed by the user's body portion and/or the tactile type VR composite credential devices 160' to determine a symbol parameter associated with the movement. For example, the system parameter may refer to a symbol traced by the one or more spatial position-movement credentials (e.g., positional parameters). For example, the system may determine that a movement performed by the user traces a generally "O" shape, a "V" shape, etc. The system may associate the credential or combination of credentials (e.g., a gesture or a combination of a gesture and voice command) with the modification or reconfiguration to the spatial component parameters associated with physical location sector desired by the user, automatically, and in real-time.

Next, the system may transform the captured one or more VR composite credentials into a first electronic form. In this regard, the system may fundamentally transform the captured VR composite credentials to an electronic format that is configured to allow searching, granular formatting, comparison, validation and the like. In some embodiments, the system may perform a preliminary registration and/or enrollment of the user for at least an initial time, so that the system may receive, record and store the VR composite credentials of the user, and correlate the same with types of modification actions (e.g., M1, U2, etc.) to be performed within the first immersive virtual simulation structure 350. After registration, the system may then store the one or more VR composite credentials in a storage device such as the physical location sector database 180. These stored one or more VR composite credentials or "reference" VR composite credentials, may then be used to analyze, interpret and authenticate future actions performed by the user within the first immersive virtual simulation structure 350. In this regard, the system may perform validation of the one or more captured VR composite credentials in light of the registered reference VR composite credentials. Based on analyzing the captured one or more VR composite credentials, the system may detect a first modification performed by the user 102 on the first mobility impeding structure 354 within the first immersive virtual simulation structure 350 using the at least one VR composite credential capture device 160 (e.g., using one or more VR composite credential capture devices of the tactile type 160' (e.g., touch-based, handheld and/or wearable)), as indicated by block 302F. As a non-limiting example illustrated by FIG. 3E (and FIG. 3D), the user may perform first modification M1 to a first mobility impeding structure 354 of a desk type to move/alter a position of the first mobility impeding structure 354 (from position 16 to 16' as illustrated in FIG. 3D), such that the user's traversal along a path portion 62 of path 60 is not impeded by the first mobility impeding structure 354 at the altered position.

Moreover, the system may generate a first plan file 310 associated with the first physical location sector 10, as indicated by block 302B. The plan file 310 may reflect a planar depiction of the physical location sector and/or the first immersive virtual simulation structure 350. In some embodiments, the first plan file is associated with a planar projection of the layout associated with the first physical location sector. The plan file 310 may comprise planar projections of the physical spatial components and/or the simulated mobility impeding structures. FIG. 3D illustrates a non-limiting example of the presentation of the first plan file 310. In response to determining the modification/reconfirmation performed in the first immersive virtual simulation structure 350, the system may automatically and dynamically transform the first pan file to reflect the reconfiguration. Here, the system may transform, in real-time, the first plan file based on the first modification and augment a modification log with the first modification, as indicated by block 302G. FIG. 3D illustrates a non-limiting example of the transformation of the first plan file 310 based on the composite plan modification 16', such that the transformed first plan file comprises the planar projection the first modification M1 of the first mobility impeding structure.

FIGS. 4A-4B illustrate block diagrams depicting a high level process flow 400A-400B for adaptive augmented reality based dynamic processing of spatial component parameters based on detecting accommodation factors in real time, in accordance with an embodiment of the invention. One or more of the steps described herein may be performed by the processing system 108, for example, in response to the processing device 138 executing computer readable instructions 142 of the processing system application 144, in some embodiments. Typically, the system is configured to initiate presentation of interfaces of an entity resource application 168 on display devices associated with the entity system 106. In this regard, the system is configured to transmit, store, activate and/or invoke the entity resource application 168 on the entity system 106.

As discussed previously, the physical location sectors may comprise, a building/dwelling (e.g., a building structure), a portion of the building/dwelling, a floor associated with a building/dwelling, a portion of a floor associated with a building/dwelling, a combination of a plurality of rooms of the building/dwelling, a room of the building/dwelling and/or the like. Typically, each physical location sector comprises one or more physical spatial components such as one or more floors, roofs, walls, load bearing structures (e.g., beams, pillars, joists, etc.), entrances and exits (e.g., doorways, doors, etc.), windows, fixtures, furniture, walkways, corridors, stairs, elevators, variations in a contour of the floor (e.g., slope, a protrusion in the floor, a depression in the floor, and/or the like), and/or other physical structures and items. Here, the one or more physical spatial components may be associated with one or more structural parameters. Moreover, the three-dimensional arrangement of the one or more physical spatial components within the physical location sector may be referred to as a layout of the physical location sector.

Initially, at block 410, the system may receive, via a user interface 302 of a network device (e.g., first user device 104), a request for an accommodation mobility activity from a user 102, wherein the accommodation mobility activity is associated with a first physical location sector 10, wherein the physical location sector is associated with a plurality of physical spatial components 12. The accommodation mobility activity may relate to analyzing the physical location sector in accordance with accommodation factors.

At block 420, the system may generate a first plan file 310 associated with the first physical location sector 10, wherein the first plan file 310 is associated with a planar projection of the layout associated with the first physical location sector 10. The plan file 310 may reflect a planar depiction of the physical location sector and/or the first immersive virtual simulation structure 350. In some embodiments, the first plan file is associated with a planar projection of the layout associated with the first physical location sector. The plan file 310 may comprise planar projections of the physical spatial components and/or the simulated mobility impeding structures. FIG. 3D illustrates a non-limiting example of the presentation of the first plan file 310.

As illustrated by block 430, the system may detect, via the at least one VR composite credential capture device 160, initiation of the accommodation mobility activity by a user 102. The system may determine initiation of the accommodation mobility activity based on determining a predetermined credential provided by or gesture performed by the user, as described previously with respect to block 302C of FIG. 3A.

At block 440, the system may trigger, using the one or more composite credential sensor devices 250 of the at least one VR composite credential capture device 160, capture of one or more VR composite credentials of the user 102 at a first time. Here, the system may analyze the captured one or more VR composite credentials of the user 102 at the first time. Accordingly, the system may determine a first accommodation factor associated with the user 102, wherein the first accommodation factor is associated with mobility of the user 102 at the first physical location sector 10, and/or determine a first mobility assist device 90 associated with the user 102, wherein the first mobility assist device 90 is associated with facilitating mobility of the user 102 at the first physical location sector 10. In some embodiments, the user may be associated with one or more accommodation factors. As used herein, an accommodation factor may relate to an aspect of a user (i.e., an individual) that may differently affect the user's mobility. As non-limiting examples, the accommodation factor(s) may comprise movement, vision, depth perception, sound perception, and/or the like. In some embodiments, the user may be associated with one or more mobility assist devices utilized by the user for mobility purposes. In this regard, the one or more mobility assist devices may comprise a wheelchair, crutches, a cane, sonar navigation device, seeing-eye dog, and/or the like.

As illustrated by block 450, the system may construct a first immersive virtual simulation structure 350 associated with the first physical location sector 10, wherein constructing the first immersive virtual simulation structure 350 further comprises constructing a plurality of simulated mobility impeding structures 352 associated with the plurality of physical spatial components 12 based on a layout of the first physical location sector 10. As described previously, the system typically constructs a first immersive virtual simulation structure 350 associated with a first physical location sector 10 (e.g., a room, a floor, a building, etc.) having one or more physical spatial components 12. Typically, the first immersive virtual simulation structure 350 is structured such that it reflects a 1:1 simulation of the physical location sector. In this regard, the system constructs the simulated mobility impeding structures 352 within the first immersive virtual simulation structure 350. Typically, each simulated mobility impeding structure 352 is a simulation of and is associated with a respective physical spatial component 12 (e.g., as illustrated by FIG. 3E). Typically, the immersive virtual simulation structure may be constructed to present a 1:1 simulation of the physical location sector to the participating user.

At block 460, the system may present, via a user display device (e.g., display 230 of the at least one VR composite credential capture device 160, display device 112 of the user device 104, and/or the like), the first immersive virtual simulation structure 350 to the user 102 such that a first location (e.g., location 3 illustrated in FIG. 3B) associated with the user 102 is within a display region 330 associated with the first immersive virtual simulation structure 350 associated with the first physical location sector 10. Here, the first immersive virtual simulation structure 350 is presented in a manner to offer an immersive experience to the participating user 102, with the immersive virtual simulation structure 350 being presented in a 360° view around a physical location of the user. Typically, a scale of the presented immersive virtual simulation structure 350 is dynamically modified such that a ratio of a dimensional parameter of the user and a corresponding dimensional parameter of the immersive virtual simulation structure 350 is 1:1, as illustrated by the non-limiting example of FIG. 3E. In this regard, the first immersive virtual simulation structure 350 is presented such that a first location (e.g., location 3 illustrated in FIG. 3B) is within the first immersive virtual simulation structure 350. Here, the system may determine that the user 102 is within a display region 330 (also referred to as capture region 330) associated with the first immersive virtual simulation structure 350 associated with the first physical location sector 10. In this regard, the system may transmit control signals to the at least one VR composite credential capture device 160, display 230 of the at least one VR composite credential capture device 160, display device 112 of the user device 104, and/or the like, tactile type VR composite credential devices 160' (e.g., headset) to singularly or collectively present the first immersive virtual simulation structure 350. FIG. 3E illustrates a non-limiting example of the presentation of the first immersive virtual simulation structure 350 to the user 102.

As discussed previously, for adapting and customizing the first immersive virtual simulation structure 350 to the users' accommodation factors and mobility devices, the system may first trigger, using the one or more composite credential sensor devices 250 of the at least one VR composite credential capture device 160, capture of one or more VR composite credentials of the user 102 at a first time (e.g., at block 302C). The system may then analyze the captured one or more VR composite credentials of the user 102 at the first time. The system may determine a first accommodation factor associated with the user 102, Here, the first accommodation factor is associated with mobility of the user 102 at the first physical location sector 10, such as movement, vision, and/or the like. The system may then determine a first mobility assist device 90 associated with the user 102. Here, the first mobility assist device 90 is associated with facilitating mobility of the user 102 at the first physical location sector 10, such as a wheelchair, crutches, a cane, sonar navigation device, seeing-eye dog, and/or the like. In accordance with the first accommodation factor, and/or the first mobility assist device 90, the system may dynamically modify the display region 330 (also referred to as capture region 330) to an adapted display region 330' (also referred to as adapted capture region 330') such that a current user view zone matches the adapted display region 330' (also referred to as adapted capture region 330'). Here, the system may first determine that, based on first mobility assist device 90, that the initial display region 330 (also referred to as capture region 330) does not match the current user view zone. In response, the system may construct the first immersive virtual simulation structure 350 to be compatible with the adapted display region 330' (also referred to as adapted capture region 330') such that a current user view zone matches the adapted display region 330' (also referred to as adapted capture region 330').

In some embodiments, the adapted display region 330' (also referred to as adapted capture region 330') may relate to movement factors. The user can navigate thru the simulation of the physical location sector in a physical mobility assist device to determine accessibility, heights, flooring, etc. Alternatively, the invention may construct a simulated mobility assist device to determine accessibility, heights, flooring, etc. Users may then navigate through paths in the simulation of the physical location sector to ensure it is accessible, usable, and that it incorporates best practices (e.g., ensuring that a user with a mobility assist device can access an ATM fully without hitting a wall). In this regard, in some embodiments, the adapted display region 330' (also referred to as adapted capture region 330') may relate to movement factors, as will be described previously with respect to adapting the cartesian coordinate system to match the user view zone in accordance with the mobility assist device.

In some embodiments, the system may construct a first route 60 associated with the first physical location sector 10 for directing the user 102, such that the first route traverses some or all of the pathways available within the physical location sector. Here, the first route 60 comprises a first path portion 62, a second path portion (not illustrated), and/or the like. The system may present, dynamically, this first route 60 in the first immersive virtual simulation structure 350 to direct the user 102 through the first immersive virtual simulation structure 350. Subsequently, the system may then detect, via the one or more composite credential sensor devices 250, the first path portion 62 of the user 102 from the first location to a second location in the first immersive virtual simulation structure 350.

In some embodiments, the system may determine one or more structural parameters 70 associated with the first mobility impeding structure 354. Here, the system may present, via the user display device (e.g., display 230 of the at least one VR composite credential capture device 160, display device 112 of the user device 104, and/or the like), the one or more structural parameters 70 associated with the first mobility impeding structure 354 to the user 102 within the first immersive virtual simulation structure 350 (e.g., as illustrated by dynamic graphical overlay elements 360 within a current user view zone). Here, the one or more physical spatial components may be associated with one or more structural parameters comprising fixed parameters of the physical spatial components such as coordinates (e.g., cartesian coordinated with respect to a predetermined origin), height parameters, depth parameters, width parameters, angle of slope, associated/structurally connected physical spatial components (e.g., a beam supporting a wall), supported load value, supported moments and forces, elevation, and/or the like. The one or more physical spatial components may be associated with one or more structural parameters comprising observer-based variable parameters of the physical spatial components which are relative to an observer (e.g., relative to the user's location in the immersive virtual simulation structure) such as distance from observer, difference between a height of the observer and a height of the physical spatial component, and/or the like. The observer-based variable type structural parameters may be continuously and dynamically determined in-situ, in real-time, while the user is within or is navigating the immersive virtual simulation structure. Moreover, the three-dimensional arrangement of the one or more physical spatial components within the physical location sector may be referred to as a layout of the physical location sector. In some embodiments, the one or more physical spatial components, their three-dimensional layout, and/or the associated structural parameters, either singularly or in combination, may be referred to as spatial component parameters.

As illustrated by block 470, the system may determine a first mobility impeding structure 354 of the plurality of simulated mobility impeding structures 352 that is structured to impede the mobility of the user 102 along the first path portion 62. Typically, determining that the first mobility impeding structure 354 of the plurality of simulated mobility impeding structures 352 is structured to impede the mobility of the user 102 along the first path portion 62 comprises determining that (i) the first mobility impeding structure 354 impedes the first accommodation factor associated with the user 102, and/or (ii) the first mobility impeding structure 354 impedes the first mobility assist device 90 associated with the user 102. In some embodiments, the system may determine that the first mobility impeding structure 354 of the plurality of simulated mobility impeding structures 352 is likely to impede movement/mobility of the user, in response to determining that (i) at least a portion of the user's body and/or at least a portion of the user's mobility assist device intersects the first mobility impeding structure 354 or another simulated mobility impeding structure 352, when the user is traversing along a path within the first immersive virtual simulation structure 350, and/or (ii) that there is no other possible way of traversal along the path that does not lead to the intersection of at least a portion of the user's body and/or at least a portion of the user's mobility assist device with the first mobility impeding structure 354 or another simulated mobility impeding structure 352. In some embodiments, the system may determine that the first mobility impeding structure 354 of the plurality of simulated mobility impeding structures 352 is likely to impede movement/mobility of the user, in response to determining that the first mobility impeding structure 354 or another simulated mobility impeding structure 352 is likely to interfere, slow down, hinder or otherwise impede the user's traversal or the mobility assist device's traversal along a path within the first immersive virtual simulation structure 350. As a non-limiting example illustrated in FIG. 3E, the system may determine that the user's traversal along a path portion 62 of path 60 is impeded by a first mobility impeding structure 354 of a desk type. For instance, the system may determine that the first mobility impeding structure 354, i.e., the desk, prevents comfortable turning of a user's mobility assist device of a wheelchair type, around the corner.

At block 480, the system may perform a first modification M1, in real-time, of the first mobility impeding structure 354 in the first immersive virtual simulation structure 350, wherein modifying comprises (i) spatially displacing the first mobility impeding structure 354, (ii) modifying one or more structural parameters 70 of the first mobility impeding structure 354, and/or (iii) removing the first mobility impeding structure 354.

Here, the system may detect a first user modification action performed by the user 102 on the first mobility impeding structure 354 within the first immersive virtual simulation structure 350 using the at least one VR composite credential capture device 160 (e.g., using one or more VR composite credential capture devices of the tactile type 160' (e.g., touch-based, handheld and/or wearable)), wherein the first modification M1 of the first mobility impeding structure 354 in the first immersive virtual simulation structure 350 is based on the user modification action (e.g., performed using one or more VR composite credential capture devices of the tactile type 160' (e.g., touch-based, handheld and/or wearable)), as described previously with respect to FIGS. 3A-3E.

In this regard, as described previously, the system may determine one or more spatial position-movement credentials associated with first user modification action (e.g., one or more spatial position-movement credentials associated with the one or more VR composite credential capture devices of the tactile type 160' (e.g., touch-based, handheld and/or wearable)). Subsequently, the system may determine a first gesture associated with the one or more spatial position-movement credentials. Subsequently, the system may determine that (i) the first gesture and (ii) the one or more spatial position-movement credentials match a predetermined modification action and match the first mobility impeding structure 354.

As illustrated by block 490, the system may present, dynamically, the first modification M1 of the first mobility impeding structure 354 in the first immersive virtual simulation structure 350 to the user 102. Here, the system may present a virtual simulation of the desired modification.

As illustrated by block 510, the system may transform, in real time, the first modification M1 of the first mobility impeding structure 354 into a composite plan modification 16' associated with a planar projection 16 of the first mobility impeding structure 354. Subsequently, the system may transform the first plan file 310 based on the composite plan modification 16', such that the transformed first plan file 310' comprises the planar projection 16' the first modification M1 of the first mobility impeding structure 354, as illustrated by FIG. 3D.

In some embodiments, the system may construct a final plan file for the first physical location sector 10 based on the transformed first plan file 310. Subsequently, the system may initiate, via the network device (e.g., first user device 104), presentation of the final plan file.

In some embodiments, the system may initiate presentation of the transformed first plan file 310 via the network device (e.g., first user device 104) within the user interface 302 and/or the user display device (e.g., display 230 of the at least one VR composite credential capture device 160, display device 112 of the user device 104, and/or the like) within the first immersive virtual simulation structure 350, within a predetermined time interval following the first modification M1 of the first mobility impeding structure 354 at the first immersive virtual simulation structure 350.

In other embodiments, the system may detect a second user modification action U2 (e.g., widening a doorway 356) performed by the user 102 on a second mobility impeding structure 356 (e.g., a doorway) of the plurality of simulated mobility impeding structures 352 within the first immersive virtual simulation structure 350. Here, the system may determine a first change in one or more structural parameters 70D associated with the second mobility impeding structure 356 caused by the second user modification action U2 (e.g., the widening causing removal or a load-bearing beam). The system may analyze the second user modification action U2 and the first change in the one or more structural parameters 70D associated with the second mobility impeding structure 356. In response to determining that (i) the second user modification action U2 is not compatible with the second mobility impeding structure 356, and/or (ii) the second user modification action U2 is not compatible with the first physical location sector 10, the system may prevent the second user modification action U2 by the user 102. In this regard, the system may determine that the first change in one or more structural parameters 70D associated with the second mobility impeding structure 356 associated with the second user modification action U2 causes a cascading change in one or more structural parameters 70 associated with one or more of the plurality of physical spatial components 12 (e.g., one or more structural parameters 70C of a roof structure 14 due to removal of the beam) associated with first physical location sector 10. Here, the system may determine that the cascading change in one or more structural parameters 70 is outside of a predetermined threshold range. Subsequently, the system may present a compatibility error (e.g., as illustrated by dynamic graphical overlay element 362 within current user view zone) associated with the second user modification action U2 within the first immersive virtual simulation structure 350.

Subsequently, the system identifies optimal devices and modes of presentation of the constructed integrated interface. In particular, the system identifies a plurality of display devices associated with the entity system. Here the system may identify that the system comprises multiple display devices such as screens, monitors, touch screens, computing devices, and the like. The system may then determine a first display device of the plurality of display devices to be the most optimal for the display of the integrated interface. The system may identify the first display device based on at least (i) determining that the first display device is configured to display the integrated graphical user interface (e.g., to ensure compatibility), (ii) determining that the first display device is within a predetermined proximity of a location of the user (e.g., to ensure that the user is close enough to the display device to adequately perceive the interface), (iii) determining that the user is currently active on the first display device (e.g., to ensure that the user readily perceived the interface), and (iv) determining that an auxiliary user (e.g., another user) is not currently active on the first display device (e.g., to ensure that the interface is not perceived by unauthorized individuals).

In some embodiments, the system may determine that the user is currently active on the first display device based on at least determining (i) that the user is currently perceiving/viewing the display of the first display device or that the display of the first display device in in the like of sight of the user and/or (ii) that the user has been perceiving/viewing the display of the first display device for at least a predetermined time period. In this regard, the system may analyze signals from visual capture devices (e.g., camera devices), proximity sensor devices and the like to determine that a user view zone (e.g., an area currently being viewed by the user) associated with the user matches (e.g., at least overlaps) a display area associated with the first display device. In some embodiments, the system may determine that the user is currently active on the first display device based on identifying that the user performed a predetermined action associated with the first display device within a predetermined preceding time interval. The predetermined actions may comprise actions performed on the displayed interface (e.g., mouse clicks, data entry, etc.), use of associate devices such as keyboards or pointers/mouse devices, predetermined spatial gestures, predetermined voice commands, and/or the like.

Moreover, the system is structured to determine that a user view zone of the entity user matches a display area associated with the first display device. Next the system is configured to initiate presentation of the integrated graphical user interface on a first display device associated with the entity system. Here, in some embodiments, the system presents or overlays a display of the integrated interface on the entirety of the display area of the first display device. In some embodiments, the system initiates display of the integrated graphical user interface on a display portion of the display area of the first display device that overlaps the user view zone of the entity. For example, the presentation of the integrated interface is in a display portion of the display area of a first display device that overlaps the user view zone, of the user's field of view, and not at a display portion that does not overlap the user view zone.

In some embodiments, the integrated interface is dynamic, and is updated based on current conversation inputs received from the user throughout the communication session. For example, functionality associated with new tasks may be added based on an indication received from the first user, or existing functionality in the integrated interface for a particular task may be removed based on an indication that the first user does not wish to undertake the task.

In some embodiments, the system may determine that the first display device is currently turned off. Here, the system may transmit, a control signal that is configured to turn on the first display device prior to displaying the integrated graphical user interface.

In some embodiments, the system may transmit a trigger communication to the user display device (e.g., display 230 of the at least one VR composite credential capture device 160, display device 112 of the user device 104, and/or the like) to cause the user display device (e.g., display 230 of the at least one VR composite credential capture device 160, display device 112 of the user device 104, and/or the like) to modify a visual representation of the first modification M1 of the first mobility impeding structure 354, in response to determining that a display portion of a display area of the user display device (e.g., display 230 of the at least one VR composite credential capture device 160, display device 112 of the user device 104, and/or the like) overlaps a current user view zone 340. Here, the trigger communication is configured to cause the user display device (e.g., display 230 of the at least one VR composite credential capture device 160, display device 112 of the user device 104, and/or the like) to apply a predetermined Gaussian blur to the display area of the user display device (e.g., display 230 of the at least one VR composite credential capture device 160, display device 112 of the user device 104, and/or the like) that is not associated with the first modification M1.

Here, the system may transmit the trigger communication to present a visual display of the trigger communication (e.g., trigger communication display element) to the user. This display may be presented on a display portion of a display area of the first display device that overlaps a user view zone of the user. In some embodiments, the trigger communication is configured to apply a predetermined Gaussian blur to the display area of the first display device that is not associated with the trigger communication, or otherwise blur or defocus or overlay opaque elements on the display area of the first display device that is not associated with the trigger communication.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for adaptive augmented reality for dynamic processing of spatial component parameters based on detecting accommodation factors in real time, wherein the system is structured for dynamic capture, analysis and modification of spatial component parameters in a virtual reality (VR) space and real-time transformation to composite plan files, the system comprising:
   at least one VR composite credential capture device associated with one or more composite credential sensor devices, comprising:
      one or more VR spatial sensor devices configured for capture and imaging of VR spatial movement and position credentials;
   at least one memory device with computer-readable program code stored thereon;
   at least one communication device; and
   at least one processing device operatively coupled to the at least one VR composite credential capture device, the at least one memory device and the at least one communication device, wherein executing the computer-readable program code is configured to cause the at least one processing device to:
      receive, via a user interface of a network device, a request for an accommodation mobility activity from a user, wherein the accommodation mobility activity is associated with a first physical location sector, wherein the first physical location sector is associated with a plurality of physical spatial components;
      detect, via the at least one VR composite credential capture device, initiation of the accommodation mobility activity by a user;
      trigger, using the one or more composite credential sensor devices of the at least one VR composite credential capture device, capture of one or more VR composite credentials of the user at a first time;
      construct a first immersive virtual simulation structure associated with the first physical location sector, wherein constructing the first immersive virtual simulation structure further comprises constructing a plurality of simulated mobility impeding structures associated with the plurality of physical spatial components based on a layout of the first physical location sector;
      present, via a user display device, the first immersive virtual simulation structure to the user such that a first location associated with the user is within the first immersive virtual simulation structure associated with the first physical location sector;
      detect, via the one or more composite credential sensor devices, a first path portion of the user from the first location to a second location in the first immersive virtual simulation structure;
      determine a first mobility impeding structure of the plurality of simulated mobility impeding structures that is structured to impede mobility of the user along the first path portion;
      perform a first modification, in real-time, of the first mobility impeding structure in the first immersive virtual simulation structure, wherein modifying comprises (i) spatially displacing the first mobility impeding structure, (ii) modifying one or more structural parameters of the first mobility impeding structure, and/or (iii) removing the first mobility impeding structure; and
      present, dynamically, the first modification of the first mobility impeding structure in the first immersive virtual simulation structure to the user.

2. The system according to claim 1, wherein executing the computer-readable code is configured to further cause the at least one processing device to:
   generate a first plan file associated with the first physical location sector, wherein the first plan file is associated with a planar projection of the layout associated with the first physical location sector.

3. The system according to claim 2, wherein executing the computer-readable code is configured to further cause the at least one processing device to:
   transform, in real time, the first modification of the first mobility impeding structure into a composite plan modification associated with a planar projection of the first mobility impeding structure; and
   transform the first plan file based on the composite plan modification, such that the transformed first plan file comprises the planar projection the first modification of the first mobility impeding structure.

4. The system according to claim 3, wherein executing the computer-readable code is configured to further cause the at least one processing device to: initiate a presentation of the transformed first plan file via the network device within the user interface and/or the user display device within the first immersive virtual simulation structure, within a predetermined time interval following the first modification of the first mobility impeding structure at the first immersive virtual simulation structure.

5. The system according to claim 3, wherein executing the computer-readable code is configured to further cause the at least one processing device to:
   construct a final plan file for the first physical location sector based on the transformed first plan file; and
   initiate, via the network device, presentation of the final plan file.

6. The system according to claim 1, wherein the at least one VR composite credential capture device comprises the user display device.

7. The system according to claim 1, wherein executing the computer-readable code is configured to further cause the at least one processing device to:
   analyze the captured one or more VR composite credentials of the user at the first time;
   determine a first accommodation factor associated with the user, wherein the first accommodation factor is associated with mobility of the user at the first physical location sector; and
   determine a first mobility assist device associated with the user, wherein the first mobility assist device is associated with facilitating mobility of the user at the first physical location sector; and
   wherein determining that the first mobility impeding structure of the plurality of simulated mobility impeding structures is structured to impede the mobility of the user along the first path portion comprises determining that (i) the first mobility impeding structure impedes the first accommodation factor associated with the user, and/or (ii) the first mobility impeding structure impedes the first mobility assist device associated with the user.

8. The system according to claim 1, wherein executing the computer-readable code is configured to further cause the at least one processing device to detect a first user modification action performed by the user on the first mobility impeding structure within the first immersive virtual simulation structure, wherein the first modification of the first mobility impeding structure in the first immersive virtual simulation structure is based on the first user modification action.

9. The system according to claim 8, wherein detecting the first user modification action performed by the user on the first mobility impeding structure further comprises:
   determining one or more spatial position-movement credentials associated with first user modification action;
   determining a first gesture associated with the one or more spatial position-movement credentials; and
   determining that (i) the first gesture and (ii) the one or more spatial position-movement credentials match a predetermined modification action and match the first mobility impeding structure.

10. The system according to claim 1, wherein executing the computer-readable code is configured to further cause the at least one processing device to:
   determine one or more structural parameters associated with the first mobility impeding structure; and
   present, via the user display device, the one or more structural parameters associated with the first mobility impeding structure to the user within the first immersive virtual simulation structure.

11. The system according to claim 1, wherein executing the computer-readable code is configured to further cause the at least one processing device to:
   detect a second user modification action performed by the user on a second mobility impeding structure of the plurality of simulated mobility impeding structures within the first immersive virtual simulation structure;
   determine a first change in one or more structural parameters associated with the second mobility impeding structure caused by the second user modification action;
   analyze the second user modification action and the first change in the one or more structural parameters associated with the second mobility impeding structure;
   in response to determining that (i) the second user modification action is not compatible with the second mobility impeding structure, and/or (ii) the second user modification action is not compatible with the first physical location sector, prevent the second user modification action by the user; and
   present a compatibility error associated with the second user modification action within the first immersive virtual simulation structure.

12. The system according to claim 11, wherein determining that the second user modification action is not compatible with the first physical location sector further comprises:
   determining that the first change in one or more structural parameters associated with the second mobility impeding structure associated with the second user modification action causes a cascading change in one or more structural parameters associated with one or more of the plurality of physical spatial components associated with first physical location sector; and
   determining that the cascading change in one or more structural parameters is outside of a predetermined threshold range.

13. The system according to claim 1, wherein executing the computer-readable code is configured to further cause the at least one processing device to:
   detect, using the one or more VR spatial sensor devices, one or more first mechanical degree of freedom coordinate parameters of the user in a predetermined capture region proximate the one or more VR spatial sensor devices; and
   determine one or more spatial position-movement credentials of the user based on the detected one or more first mechanical degree of freedom coordinate parameters, wherein the one or more VR composite credentials of the user comprise the one or more spatial position-movement credentials.

14. The system according to claim 1, wherein presenting, dynamically, the first modification of the first mobility impeding structure in the first immersive virtual simulation structure to the user, further comprises:
   transmitting a trigger communication to the user display device to cause the user display device to modify a visual representation of the first modification of the first mobility impeding structure, in response to determining that a display portion of a display area of the user display device overlaps a current user view zone, wherein the trigger communication is configured to cause the user display device to apply a predetermined Gaussian blur to the display area of the user display device that is not associated with the first modification.

15. The system according to claim 1, wherein executing the computer-readable code is configured to further cause the at least one processing device to:
   construct a first route associated with the first physical location sector for directing the user, wherein the first route comprises the first path portion; and
   present, dynamically, the first route in the first immersive virtual simulation structure to direct the user through the first immersive virtual simulation structure.

16. A computer program product for adaptive augmented reality for dynamic processing of spatial component parameters based on detecting accommodation factors in real time, the computer program product being structured for dynamic capture, analysis and modification of spatial component parameters in a virtual reality (VR) space and real-time transformation to composite plan files, the computer program product comprising a non-transitory computer-readable storage medium having computer-executable instructions to:
   receive, via a user interface of a network device, a request for an accommodation mobility activity from a user, wherein the accommodation mobility activity is associated with a first physical location sector, wherein the first physical location sector is associated with a plurality of physical spatial components;
   detect, via at least one VR composite credential capture device, initiation of the accommodation mobility activity by a user;
   trigger, using one or more composite credential sensor devices of the at least one VR composite credential capture device, capture of one or more VR composite credentials of the user at a first time;
   construct a first immersive virtual simulation structure associated with the first physical location sector, wherein constructing the first immersive virtual simulation structure further comprises constructing a plurality of simulated mobility impeding structures associated with the plurality of physical spatial components based on a layout of the first physical location sector;
   present, via a user display device, the first immersive virtual simulation structure to the user such that a first location associated with the user is within the first immersive virtual simulation structure associated with the first physical location sector;

detect, via the one or more composite credential sensor devices, a first path portion of the user from the first location to a second location in the first immersive virtual simulation structure;

determine a first mobility impeding structure of the plurality of simulated mobility impeding structures that is structured to impede mobility of the user along the first path portion;

perform a first modification, in real-time, of the first mobility impeding structure in the first immersive virtual simulation structure, wherein modifying comprises (i) spatially displacing the first mobility impeding structure, (ii) modifying one or more structural parameters of the first mobility impeding structure, and/or (iii) removing the first mobility impeding structure; and present, dynamically, the first modification of the first mobility impeding structure in the first immersive virtual simulation structure to the user.

17. The computer program product according to claim 16, wherein the non-transitory computer-readable storage medium further comprises computer-executable instructions to:

generate a first plan file associated with the first physical location sector, wherein the first plan file is associated with a planar projection of the layout associated with the first physical location sector;

transform, in real time, the first modification of the first mobility impeding structure into a composite plan modification associated with a planar projection of the first mobility impeding structure; and transform the first plan file based on the composite plan modification, such that the transformed first plan file comprises the planar projection the first modification of the first mobility impeding structure.

18. The computer program product according to claim 16, wherein the non-transitory computer-readable storage medium further comprises computer-executable instructions to:

analyze the captured one or more VR composite credentials of the user at the first time;

determine a first accommodation factor associated with the user, wherein the first accommodation factor is associated with mobility of the user at the first physical location sector; and determine a first mobility assist device associated with the user, wherein the first mobility assist device is associated with facilitating mobility of the user at the first physical location sector; and wherein determining that the first mobility impeding structure of the plurality of simulated mobility impeding structures is structured to impede the mobility of the user along the first path portion comprises determining that (i) the first mobility impeding structure impedes the first accommodation factor associated with the user, and/or (ii) the first mobility impeding structure impedes the first mobility assist device associated with the user.

19. A method for adaptive augmented reality for dynamic processing of spatial component parameters based on detecting accommodation factors in real time, the method being configured for dynamic capture, analysis and modification of spatial component parameters in a virtual reality (VR) space and real-time transformation to composite plan files, the method comprising:

receiving, via a user interface of a network device, a request for an accommodation mobility activity from a user, wherein the accommodation mobility activity is associated with a first physical location sector, wherein the first physical location sector is associated with a plurality of physical spatial components;

detecting, via at least one VR composite credential capture device, initiation of the accommodation mobility activity by a user;

triggering, using one or more composite credential sensor devices of the at least one VR composite credential capture device, capture of one or more VR composite credentials of the user at a first time;

constructing a first immersive virtual simulation structure associated with the first physical location sector, wherein constructing the first immersive virtual simulation structure further comprises constructing a plurality of simulated mobility impeding structures associated with the plurality of physical spatial components based on a layout of the first physical location sector;

presenting, via a user display device, the first immersive virtual simulation structure to the user such that a first location associated with the user is within the first immersive virtual simulation structure associated with the first physical location sector;

detecting, via the one or more composite credential sensor devices, a first path portion of the user from the first location to a second location in the first immersive virtual simulation structure;

determining a first mobility impeding structure of the plurality of simulated mobility impeding structures that is structured to impede mobility of the user along the first path portion;

performing a first modification, in real-time, of the first mobility impeding structure in the first immersive virtual simulation structure, wherein modifying comprises (i) spatially displacing the first mobility impeding structure, (ii) modifying one or more structural parameters of the first mobility impeding structure, and/or (iii) removing the first mobility impeding structure; and presenting, dynamically, the first modification of the first mobility impeding structure in the first immersive virtual simulation structure to the user.

20. The method according to claim 19, wherein the method further comprises:

analyzing the captured one or more VR composite credentials of the user at the first time;

determining a first accommodation factor associated with the user, wherein the first accommodation factor is associated with mobility of the user at the first physical location sector; and determining a first mobility assist device associated with the user, wherein the first mobility assist device is associated with facilitating mobility of the user at the first physical location sector; and wherein determining that the first mobility impeding structure of the plurality of simulated mobility impeding structures is structured to impede the mobility of the user along the first path portion comprises determining that (i) the first mobility impeding structure impedes the first accommodation factor associated with the user, and/or (ii) the first mobility impeding structure impedes the first mobility assist device associated with the user.

* * * * *